Nov. 1, 1927.                R. C. SIMMONS                1,647,254
                          CUTTING SHEET MATERIAL
                          Filed Nov. 9, 1922          7 Sheets-Sheet 3
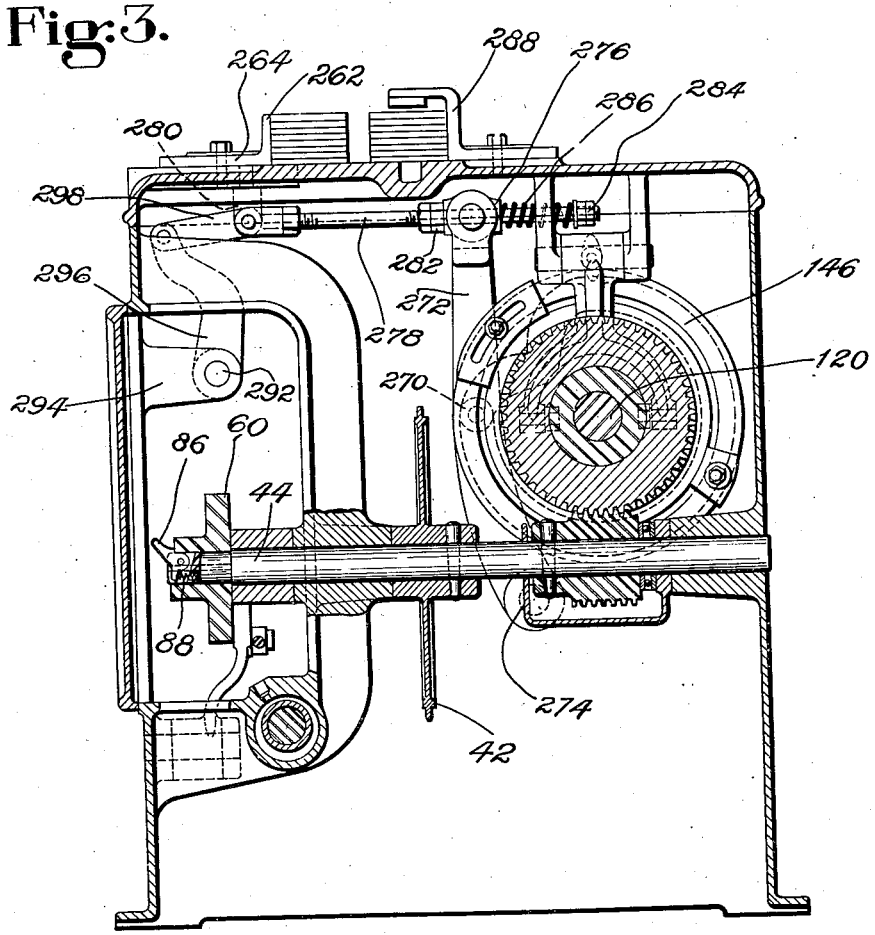
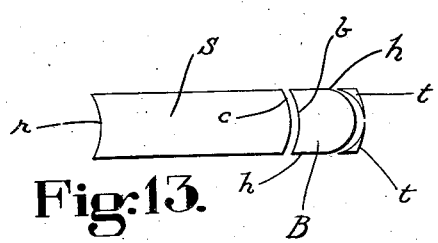

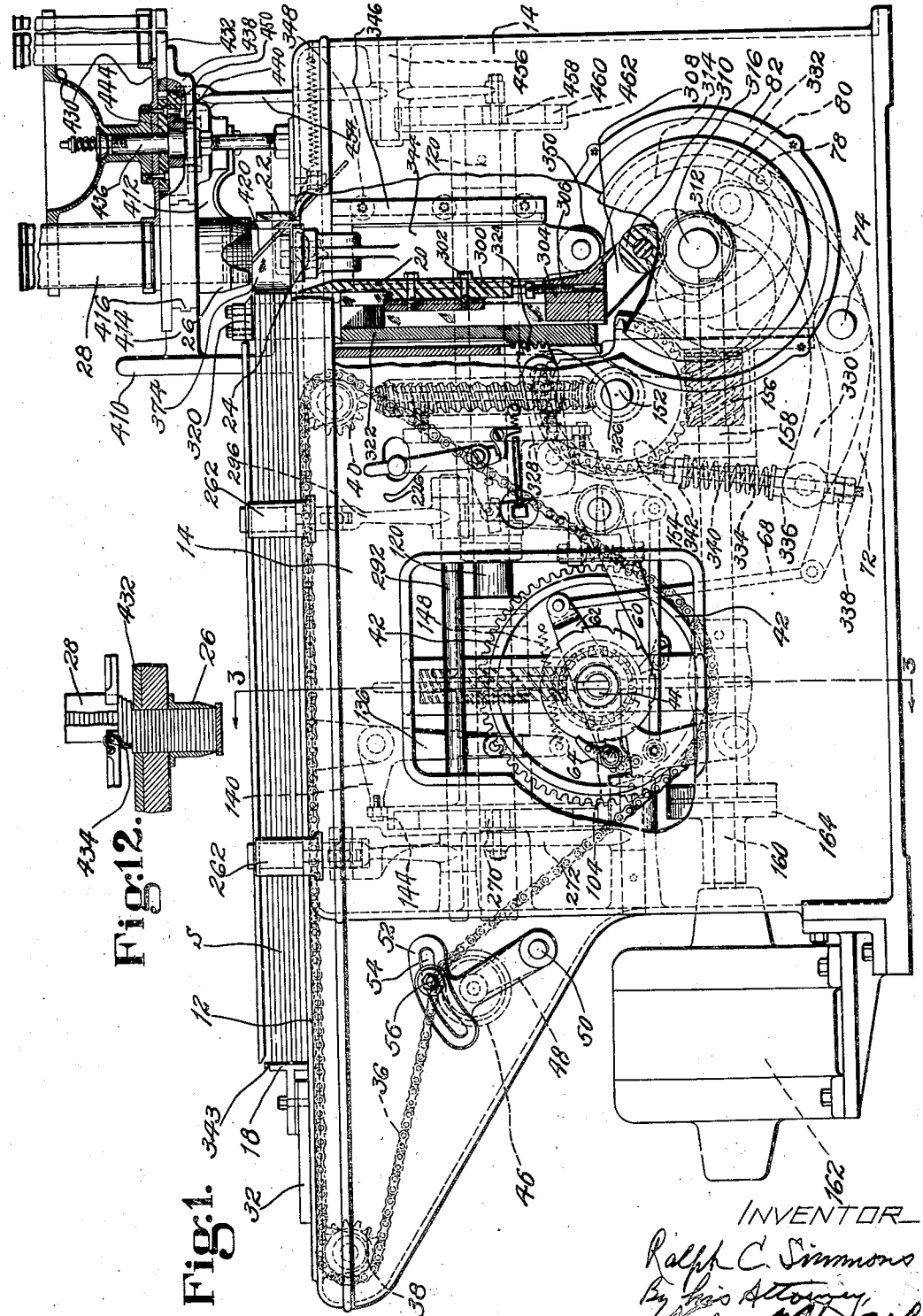

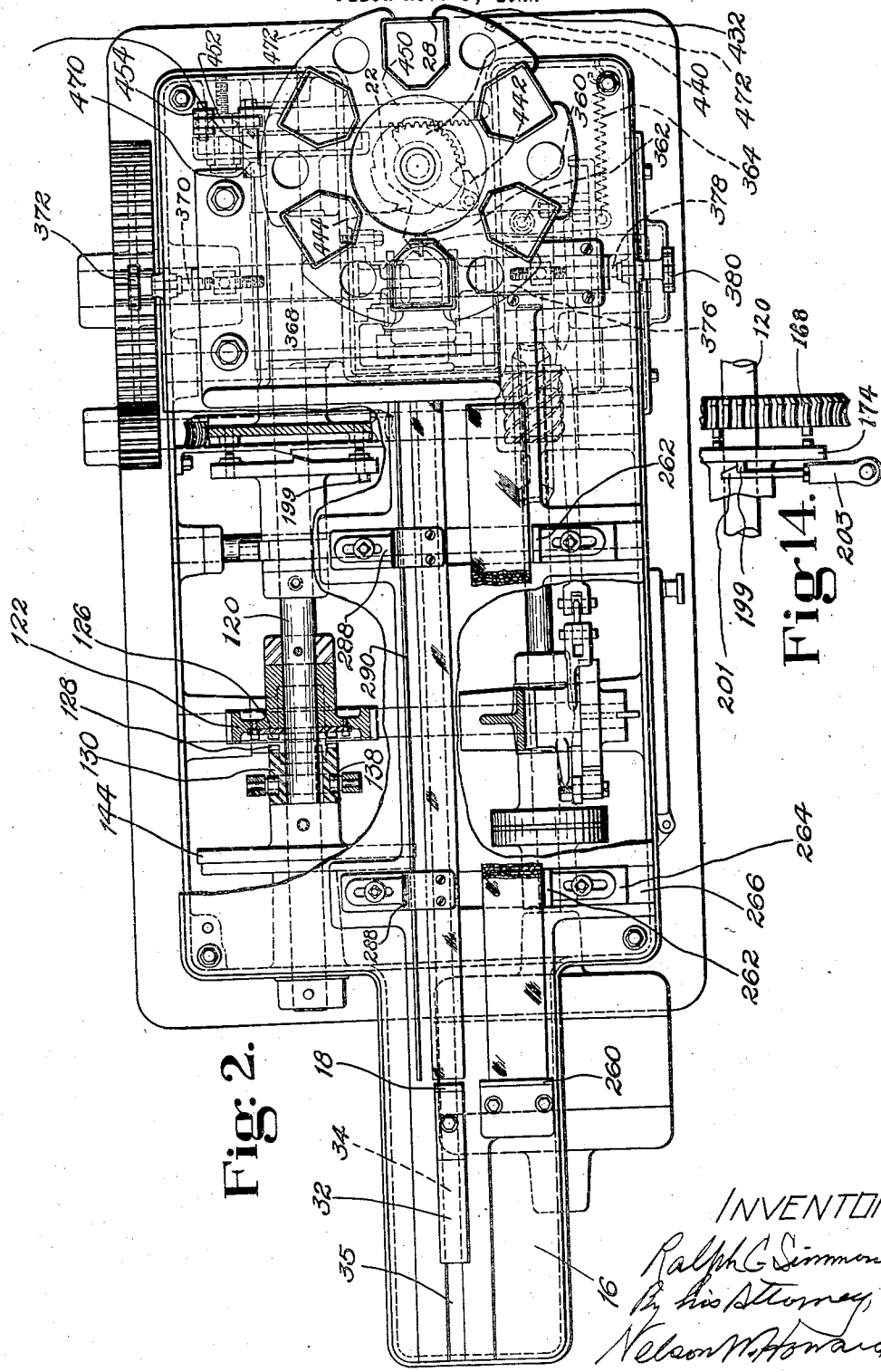

Nov. 1, 1927.  R. C. SIMMONS  1,647,254
CUTTING SHEET MATERIAL  7 Sheets-Sheet 4

INVENTOR
Ralph C. Simmons
By his Attorney
Nelson W. Howard

Nov. 1, 1927. R. C. SIMMONS 1,647,254
CUTTING SHEET MATERIAL
7 Sheets-Sheet 5
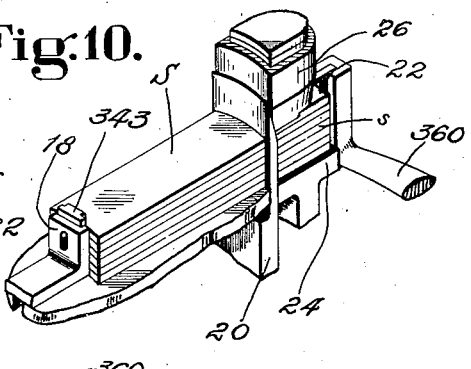
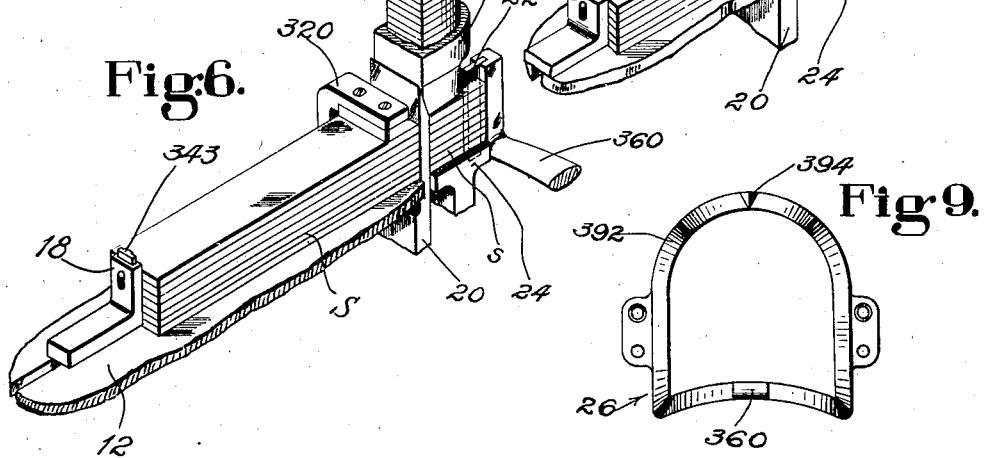
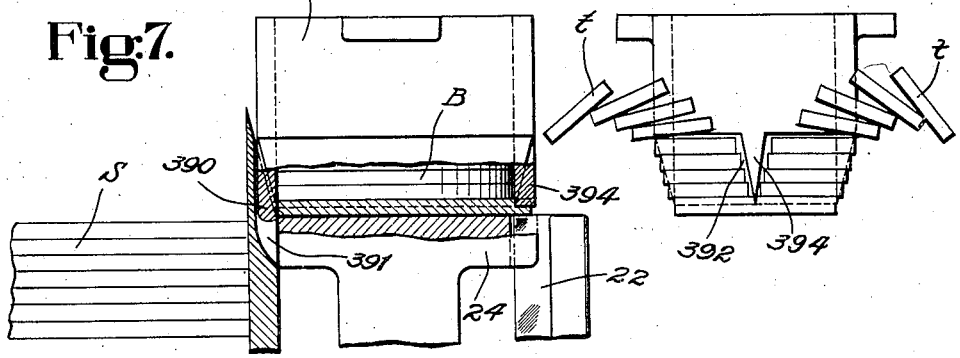
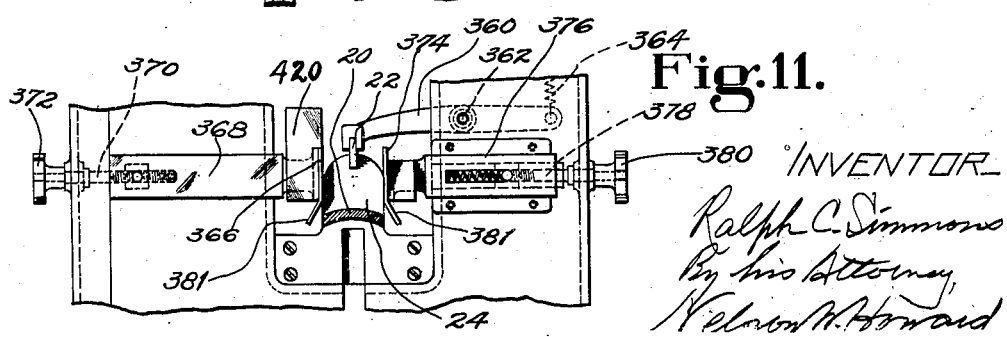

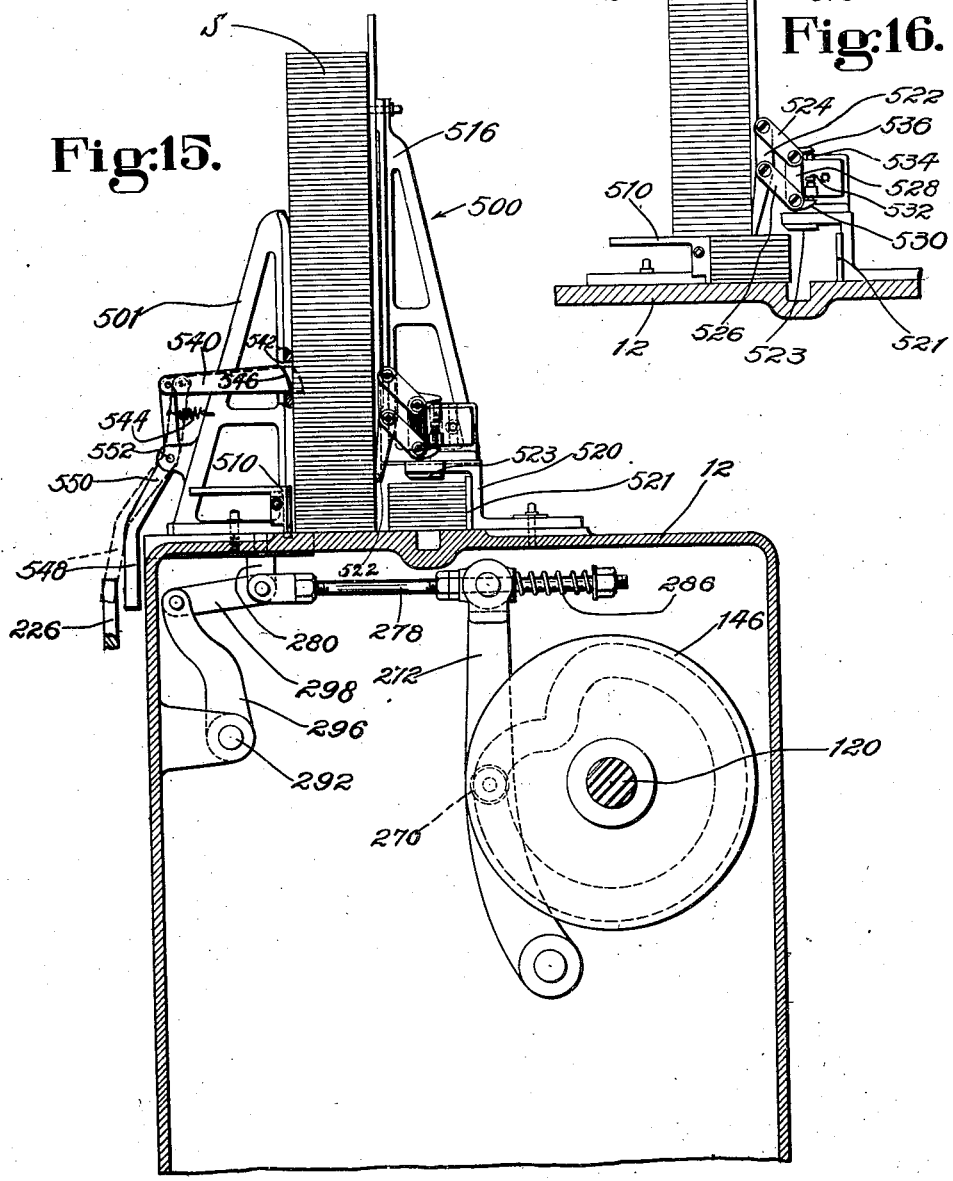

Nov. 1, 1927.

R. C. SIMMONS

CUTTING SHEET MATERIAL

Filed Nov. 9, 1922

INVENTOR
Ralph C. Simmons
By his Attorney,
Nelson W. Howard.

Patented Nov. 1, 1927.

1,647,254

UNITED STATES PATENT OFFICE.

RALPH C. SIMMONS, OF BEVERLY, MASSACHUSETTS, ASSIGNOR TO UNITED SHOE MACHINERY CORPORATION, OF PATERSON, NEW JERSEY, A CORPORATION OF NEW JERSEY.

CUTTING SHEET MATERIAL.

Application filed November 9, 1922. Serial No. 599,925.

This invention relates to the cutting of sheet material and more particularly to the quantity production of blanks from sheet material, this application being a continuation of application Serial No. 290,654, filed April 17, 1919, in my name, as to subject-matter common to the two said applications.

It is an object of the invention to provide a machine for cutting material such as, for example, leather, leatherboard, or other sheet material, which will be especially simple in construction, efficient and economical in operation, and require a minimum of attention on the part of the operator.

It is also an object of the invention to devise a method of cutting sheet material into blanks such as, for example, heel-lift blanks, which will have the advantages of insuring production of blanks in quantity from the material with the very minimum of waste and at an expenditure of power far below that heretofore considered necessary in operations attendant upon the reduction of sheet material into blanks.

It is a most important object of the invention to cut sheet material into blanks in such a manner as to insure against both the cutting of imperfect blanks and the appearance of scrap or waste pieces among the blanks as they come from the cutting means. Since the blanks which appear at a discharge station of the illustrative machine are all perfect blanks, arranged in uniform relation to each other, and free from scrap or waste pieces, it follows that they may be transferred to another machine for further operations without the loss of time and other disadvantages occasioned by rearranging and selecting operations so commonly necessary with respect to the product of blank cutting machines now in commercial use.

In one aspect the invention resides in the provision of a cutter constructed and arranged to sever sections from sheet material and, at the same time, effect the formation of part of the permanent edge contour of the desired articles or blanks which are completed through the operation of a second cutting means.

In another aspect the invention resides in a cutter which severs sections from sheet material and also alines each section properly with respect to a cutting means which operates to cut blanks from the sections.

In the illustrative machine, a cutter is provided which not only severs sections from sheet material but serves to aline the sections in a stack through co-operation with a movable member located in line with the direction of movement of the sheets from which the sections are cut.

The invention contemplates further the provision of means for feeding sheet material step by step to a cutting means in an organization which provides means automatically operative for returning the first-mentioned feeding means by a continuous movement to initial position and for repeating the step-by-step movements of the feeding means upon freshly introduced sheet material. In the illustrated construction, the described automatic means is preferably under the control of the operator as to its time of operation so that under all conditions the operator may be assured of time sufficient for the introduction of fresh material and the removal of the finished articles or blanks. In the illustrative machine the operator obtains control of the automatic means for returning the feeding means to initial position and for thereafter, without intermission, continuing the step-by-step feeding of the material, through a member which is manually operable to release the automatic means from a means which prevents its operation until proper manipulation of the said member.

In another aspect the invention resides in means for feeding sheet material to a cutting means in combination with means for returning the feeding means to initial position preliminarily to the feeding-in of freshly introduced material in an organization in which power is automatically stored up for the initiation of the operation of the second-mentioned means. Preferably this power is released only at the will of the operator and is automatically controlled so that the feeding of the material to the cutting means is properly timed.

As shown the machine embodies means for feeding in freshly introduced material in a direction transverse to its movement by the feeding means which carries it to the cutter, and also a magazine operating device for placing a magazine in alignment with the blank cutting means to receive the blanks, both of which are operated preliminarily to the operation of the feeding means which carries the work to the cutter, the construction and arrangement being such that the stack of strips fed to the cutting means is just sufficient to fill one of the magazines.

In the illustrated form of the invention, the cutter as it operates to sever sections from a stack of strips operates also to shove the sections firmly against a gage to aline the sections in a stack in a chamber or pocket with walls on all sides and through which the blank cutting means operates to cut blanks from the sections and to remove the sections from the said chamber.

In another aspect the invention consists in cutting blanks from sheet material in such manner that the severance of blanks confers the desired final contour upon a portion of each blank and, simultaneously, partially shapes another portion of each blank so that the final shaping of the blanks by another cutting or trimming operation is correspondingly reduced and may be performed rapidly and with the expenditure of the minimum of power. The method disclosed has the further advantage that in the practice of the same many more sheets may be operated upon at one time to produce blanks than is possible by methods heretofore employed.

From another viewpoint the invention comprises cutting sheet material into blanks by first cutting the sheets into strips of substantially the width of the desired blanks and then sectioning the strips at blank-length intervals by cuts which partially shape the blanks, and finally completing the shaping of the blanks by a cutting or trimming operation.

In still another aspect the invention resides in cutting sheet material into strips corresponding exactly to the width of heel lifts of the desired size, and cutting lifts from the strips by transverse cuts which confer rounded end shape and breast end shape to the opposite ends of the lifts.

Other features of the invention and novel combinations of parts will be described in the specification and pointed out in the appended claims.

In the drawings:—

Fig. 1 is a view in side elevation and partly in section of a cutting machine illustrating one embodiment of the invention;

Fig. 2 is a plan view of the machine shown in Fig. 1 with parts broken away to show operating parts of the machine;

Fig. 3 is a vertical transverse section taken along the line 3—3 of Fig. 1;

Fig. 6 is a view in perspective illustrating the operation of the cutter and of the dieing out devices.

Fig. 7 is a detail view in side elevation and partly in section of the die, the forcing plate and the cutter;

Fig. 8 is a view of the die looking from the right in Fig. 7;

Fig. 9 is a bottom plan view of the die shown in Fig. 8;

Fig. 10 is a view showing a curved cutter and the co-operating parts utilized in the production of heel lifts having a curved breast edge;

Fig. 11 is a plan view of a pocket, formed by gages and a cutter, to guide sections of sheet material during a dieing out operation;

Fig. 12 is a detail view partly in section illustrating the operation of the gate member at the beginning of the rotative movement of the magazine holder;

Fig. 13 is a diagrammatic representation of the operation of cutting a strip into blanks;

Fig. 14 is a detail of the clutch operating means for the timing clutch;

Fig. 15 is a view partly in section of a magazine and feeding in mechanism for stacks of strips;

Fig. 16 is a view similar to Fig. 15, showing the parts in a different operative relation;

Figure 4:
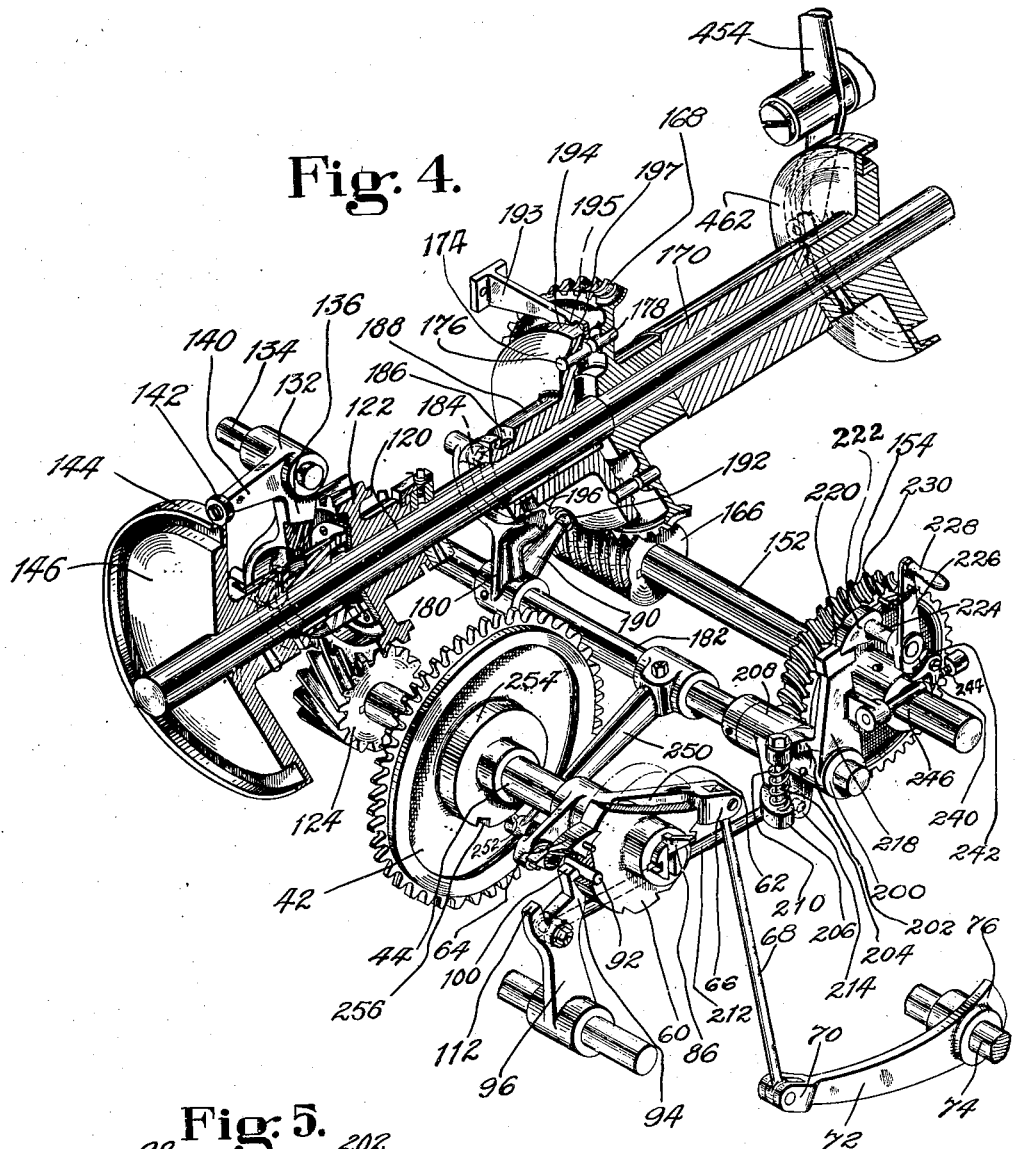
Fig. 4 is a perspective view of the operating mechanisms for the stock feeding means.

In the illustrated heel-lift cutting machine there is provided a table or work support 12 which is shown as the top plate of a box-like frame 14 for supporting the operating parts of the machine. Conveniently the work support is rectangular in shape and has an extension 16 so that pieces of work of considerable length may be supported preliminary to their introduction into the machine. Briefly stated a feeder member 18 (Figs. 1 and 2) is operated to move the sheet material comprising a stack of strips S step by step to a cutter or knife 20 which is operated to sever from the end of the strips a pile of sections and align these sections vertically against an end gage 22 so that upon upward movement of the forcing plate 24 the sections are forced upon the cutting edge of the die 26 whereby blanks are cut from the sections and forced upwardly through the die and into the magazine which at the time is aligned with the die, it being proposed to provide a plurality of magazines one of which is shown at 28 in vertical alignment with the die 26.

Power means is preferably provided for moving the feeder member 18 step by step for the purpose of advancing the sheet material to the cutter 20 and in the construction shown the said feeder member is adjustably mounted upon a plate 32 having a flange portion 34 (Fig. 2) adapted to fit in and slide along the guide slot 35, which extends the greater part of the length of the top plate 12 and its extension 16. Secured to the plate 32 is an endless chain 36 (Fig. 1) arranged to run around sprocket wheels 38 and 40 mounted in bearings in the frame 14 adjacent the top plate 12 so as to provide a horizontal portion of the chain just beneath the slot 34 whereby upon movement of said portion of the chain to the right in Fig. 1 the feeder member 18 is carried along toward the knife 20 to feed the sheet material to the latter. The chain 36 also passes around a sprocket wheel 42 (Figs. 1 and 4) carried fixedly on a shaft 44 mounted in bearings in the frame of the machine, means being provided for rotating the sprocket wheel 42 whereby movement is transmitted to the chain 36. In order to tension the chain 36 properly and to facilitate the assembly and disassembly of the chain with respect to its sprocket wheels there is conveniently provided a sprocket wheel 46 (Fig. 1) mounted upon a lever 48 fixed upon a shaft 50 rotatable in the machine frame and having an arm 52 on its projecting end which is provided with an elongated slot 54 through which projects a screw threaded securing member 56 by which the lever 48 may be secured in position to tension the chain 36, it being understood that through proper manipulation of the securing member 56 the lever 48 may be freed for oscillation so as to move the wheel 46 in a direction to slacken the chain to such an extent as to make its removal from the sprocket wheels easy of attainment. For rotating the sprocket wheel 42 there is provided a ratchet wheel 60 which is fixedly secured to the shaft 44 upon which is mounted the sprocket 42. As is clearly shown in Figs. 1 and 4 of the drawings there is provided as driving means for the ratchet wheel 60 a lever 62 mounted for oscillation on the shaft 44 and carrying at one end a pawl 64 and at its other end a forked portion 66 (Fig. 4) in which is pivoted the upper end of a link 68, the lower end of which is similarly pivoted in the forked end 70 of the lever 72, the latter being pivoted upon a bar 74 fixedly mounted in the frame 14 of the machine and having an arm 76 carrying a roll 78 movable along a cam slot 80 in a cam wheel 82 at the rear end of the machine. It will be understood that upon rotation of the continuously moving cam wheel 82 the lever 72 is rocked upon its pivot point and that this motion is transmitted to the lever 62 thus causing the pawl 64 to engage with the teeth of the ratchet wheel 60, one tooth at a time, to advance the ratchet wheel step by step whereby the sprocket wheel 42 is intermittently rotated to produce step by step feeding movements of the chain 36 and hence of the feeder member 18. The ratchet wheel 60 is provided with ten teeth with which the pawl 64 progressively engages so that the feeder member 18 is caused to move toward the cutter or knife 20 in ten equal steps, reciprocation of the cutter or knife taking place in the intervals of the feeding movement of the stock so that the latter is cut into ten portions which are presented successively to the blank cutting means as will hereinafter be described.

If it is desired to change the size of the blank, a die 26 of another size is substituted for that shown and at the same time the length of the feed movement of the feeder member 18 is adjusted to correspond and, in accomplishing this adjustment of the feeding movement, another ratchet wheel 60 having a different number of teeth is substituted for the one shown, provision being made for ready interchanging of ratchet wheels as indicated in Fig. 3 of the drawings, wherein it may be seen that the ratchet wheel 60 is held upon the shaft 44 by means of a latch 86 which is pressed by a spring 88 in the latching direction to hold the ratchet on the shaft, and that the latch 86 may be readily depressed by the operator to release the ratchet wheel 60 so that the latter may be removed as a preliminary to the substitution of another ratchet wheel with a different number of teeth.

Figure 5:
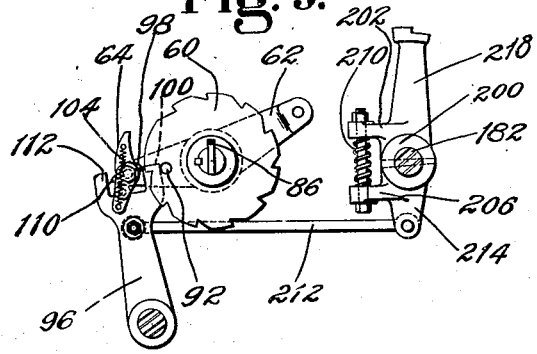
Fig. 5 is a detail of the pawl and ratchet mechanism of the feeding means.

Means is preferably provided for discontinuing automatically the feeding-in movement of the feeder member 18 when a predetermined point in the exhaustion of the stock has been reached. In the construction shown this takes place when the feeder member 18 has arrived at a position in which its stock-engaging surface is in practically vertical alignment with the cutting edge of the knife or cutter 20, so that the cutter performs no cutting operation on the last stack of sections. To effect this automatic throwing out of the pawl and ratchet mechanism which constitutes the driving means for the feeder member 18, there is provided in the construction shown (Fig. 4) a pin or stud 92 mounted fixedly in the ratchet wheel 60 so as to have a portion projecting beyond the rear face of the ratchet wheel near the periphery thereof in a position to engage with a projecting portion 94 of the lever 96 the engagement taking place during the upward movement of the pawl 64 while in engagement with the last tooth on the ratchet wheel 60. By reason of the engagement of the pin 92 with the lever 96 the latter is shoved over to the left as shown in Fig. 4 which figure should be compared with Fig. 1 with respect to the position of the lever 96. Upon downward movement of the pawl 64 after having engaged the last tooth as shown in Fig. 4, the tail 98 of the pawl 64 engages with the fork 100 of the lever 96 with the result that the top end of the pawl is thrown over to the left (Fig. 5) and held in this position by the spring 104 in which position the pawl is no longer operative to move the ratchet wheel 60 although the lever 62 upon which the pawl is mounted continues to oscillate because of its connection with the continuously rotating cam wheel 82. It will be understood that this disconnection of the pawl 64 from its ratchet wheel 60 constitutes the arrangement and mode of operation to effect the automatic discontinuation of the feeding of the stock to the cutter. For restoring the pawl 64 to operative relation with respect to the ratchet wheel 60 it is necessary to remove the pin 92 from contact with the lever 96 which is effected by means which will be hereinafter described whereupon the lever 96 is returned to the extreme right of its path of movement. With the lever 96 in its right hand position the next movement downwardly of the pawl 64 causes the other tail 110 of the pawl to strike upon the fork 112 of the lever 96 whereupon the said pawl is swung in a direction to cause its upper end to come in contact with the teeth on the ratchet wheel 60, the pawl being held in this position by the spring 104 which it will be observed is so connected to the pawl 64 as to hold the said pawl yieldingly in both of its positions, the spring being in the two positions on opposite sides of the center of rotation of the pawl about its pivot on the lever 62. It should be stated that in removing the pin or stud 92 from contact with the lever 96 as shown in Fig. 4 of the drawings, the ratchet wheel 60 is rotated in the reverse direction thus bringing the pin into position above the upper end of the lever 96 and the first tooth of the ratchet wheel 60 in position to be engaged by the pawl 64 as shown in Fig. 1 of the drawings. This reverse movement of the ratchet wheel 60 takes place while the feeder member 18 is being returned to initial position at the left end of the machine, as shown in Fig. 1.

Preferably, and as shown, means is provided for running the feeder member 18 back to its initial position by a continuous movement thus securing a more rapid operation of the machine than would be possible if it were necessary to operate the machine in such a manner as to move the feeder member 18 back to initial position by a step-by-step movement. In order to move the chain 36 and the feeder member 18 mounted thereon continuously in a direction from right to left in Fig. 1 of the drawings, it is obviously necessary to rotate the sprocket wheel 42 and the shaft 44 continuously in a counter-clockwise direction and this is accomplished by means which will now be described. Mounted in bearings in the frame of the machine is a shaft 120 lying above and in a direction at right angles to the direction of the shaft 44 (Figs. 1, 2 and 4). Mounted loosely on the shaft 120 is a spiral gear wheel 122 which is constantly in mesh with a spiral gear 124 keyed to the shaft 44. As shown most clearly in Fig. 2, the hub of the gear wheel 122 is provided with teeth 126 arranged to be engaged by corresponding teeth 128 on a sliding clutch member 130 which is splined to rotate with the shaft 120, movement of the clutch member 130 in clutching direction being caused at the proper time by a bell-crank lever 132 (Fig. 4) oscillatable on a pivot 134 carried by the frame of the machine. The arm 136 of the bell-crank lever is forked and carries rolls 138 (Fig. 2) movable along a groove in the clutch member 130, the other arm 140 (Fig. 4) of the bell-crank being provided with a roll 142 which is held constantly in contact with a cam surface 144 on the cam wheel 146 by means of a spring 148 (Fig. 1). It will be clear that when the low part of the cam 144, which extends about half way of the circumference of the cam wheel 146, arrives beneath the roll 142 that the spring 148 will be permitted to move the clutch member 130 to the right thus causing engagement of the teeth 128 on the clutch member with the teeth 126 on the hub of the gear wheel 122 whereby the latter will be driven from the shaft. As the shaft 120 is rotated continuously for a certain period of time in clockwise direction the shaft 44 and the sprocket wheel 42 carried thereby will be rotated in counterclockwise direction to move the feeder member 18 continuously back to its initial position. For driving the shaft 120 at the desired intervals there is provided a clutch mechanism for operatively connecting the shaft with the constantly driven shaft 152, the driving means for the latter shaft comprising a worm gear 154 (Fig. 1) fixed to the shaft and arranged to be constantly in mesh with a worm 156 fixed to the shaft 158 carried in bearings in the lower part of the frame of the machine and secured to the armature shaft 160 of the motor 162 by means of an Oldham coupling 164. It will be understood then that upon closing the motor circuit, through a switch located at any convenient place on the machine, the shaft 158 will be driven continuously and that this continued rotation will be transmitted through the gears mentioned to the shaft 152. Secured to the other end of the shaft 152 is a worm 166 (Fig. 4) which is arranged to be constantly in mesh with a worm gear 168 mounted loosely on the shaft 120, the gear 168 being held from movement lengthwise of the shaft by reason of contact with the shaft bearing 170 on the frame of the machine. Splined upon the shaft 120 is a clutch member 174 carrying pins 176 adapted for engagement with pins 178 secured to the face portion of the worm gear 168. For moving the clutch 174 lengthwise of the shaft into clutching relation with respect to the worm gear 168 there is provided a bell crank 180 secured to a shaft 182 mounted in bearings in the machine frame and carried thereby in parallel relation with respect to the shaft 152. One arm of the bell crank 180 is forked and is provided with rolls one of which is shown at 184 in engagement in a groove 186 in the sleeve portion 188 of the clutch member 174, the other arm 190 of the bell crank carrying a roll 192 for contact with a cam surface 194 on the periphery of the clutch member 174 there being a recess 196 in the cam surface 194 for receiving the roll 192 when the forked end of the bell crank 180 is moved to the left in Fig. 4 to unclutch the shaft 120 from the worm gear 168. It will be understood that the purpose of the arm 190 of the bell crank with the roll 192 at the end thereof contacting with the surface 194 on the clutch member 174 is to insure that the latter will be held in clutching relation with respect to the worm gear 168 through one complete revolution of the clutch member 174 thereby providing for a complete rotation of the shaft 120. At the end of the revolution of the clutch member 174, the roll 192 may drop into the recess 196 thus permitting the forked end of the bell crank to move to the left in Fig. 4 when the clutch member 174 is withdrawn from contacting with the constantly rotating worm gear 168 whereby rotation of the shaft 120 is discontinued. For causing disconnection of the clutch member 174 with respect to the gear 168 there is provided in the illustrative construction a member 193 (Fig. 4) fixedly carried upon some stationary part and having a wedge or cam projection 195 adapted to contact with a corresponding cam projection 197 on the clutch member 174 as the latter approaches the end of one complete revolution. It will be clear that the operation of these two cams or wedge projections will be to force the clutch member 174 in a direction away from the gear 168 to effect disconnection of the clutch, it being understood that the cam projection 197 on the clutch member 174 is so located that it comes in contact with the stationary cam projection 195 at a time when the recess 196 has arrived to accommodate the roll 192 on the bell crank 180. Hence, when the cam projections 195, 197 co-operate to separate the clutch member 174 from the gear 168 the bell crank 180 is rocked to the left in Fig. 4 and at the same time rotates the shaft 182 in a counter clockwise direction. For insuring perfect co-operation of the cam projections 195, 197 and for carrying the projection 197 beyond the projection 195 in the direction of rotation of the clutch member 174 there is provided means for giving the said clutch member a slight, extra movement in its direction of rotation after it would normally have stopped due to its separation from the continuously rotating gear 168. Conveniently, the means for accomplishing this purpose comprises a pin or stud 199 (Figs. 2 and 14) extending from the face of the clutch member 174 in a position to be engaged by a hook 201 at the upper end of a rod 203 which is constantly reciprocated since it is pivoted to a projection at the end of the constantly oscillating lever 330, hereinafter described. Mounted upon the other end of the shaft 182 and fixedly pinned thereto is a sleeve 200 which fixedly carries an arm 202 through which passes a bolt 204 the other end of which is slidably received in the end of an arm 206 fixedly secured to a sleeve 208 which is rotatable on the shaft 182. Surrounding the bolt 204 and contacting with the opposed surfaces of the arms 202, 206 is a spring 210 through which movement will be yieldingly transmitted to the shaft 182 to rotate the latter in clockwise direction when the lever 96 is moved to the left (Fig. 4), because of the link 212 which connects the said lever 96 with an arm 214 secured to the sleeve 208 which as before stated is loosely mounted on the shaft 182. It will be recalled that the lever arm 96 is moved to the left by the pin 92 on the ratchet wheel 60 just at the termination of the step-by-step movement of the ratchet wheel by which the feeder member 18 is intermittently progressed in its feeding direction. Hence at the same time that the step-by-step movement of the feeder member 18 is discontinued, the shaft 182 is yieldingly moved through the spring 210 in a direction to carry the upper end of the bell crank 180 to the right in Fig. 4, thus throwing the clutch member 174 into clutching relation with respect to the worm gear 168 whereby the shaft 120 is thrown into operation and caused to rotate continuously for one complete revolution. By this means and by connections to the shaft 44 the sprocket wheel 42 is moved continuously in a counterclockwise direction to run the feeder member 18 by continuous movement back to initial position and at the same time the ratchet wheel 60 is rotated in the same direction to remove the pin 92 from contact with the lever 96 and the ratchet wheel itself so positioned as to bring the first tooth opposite to the upper end of the pawl 64 preliminary to a repetition of the step-by-step feeding movement of the pawl and ratchet mechanism which commences on the next downward movement of the pawl 64 on the constantly oscillating lever 62, the tail 110 of the pawl striking the fork 112 thus throwing the pawl 64 over into operative relation with respect to the ratchet wheel 60. It will thus appear that the machine may automatically feed in the material by a step-by-step movement of the feeder member 18 and then automatically reverse the movement of the feed chain 36 to carry the feeder member 18 by continuous movement back to initial position and then without intermission throw in again the pawl and ratchet mechanism to repeat the step-by-step movement upon a freshly introduced piece of stock.

Means is preferably provided for enabling the operator to control the automatic means for causing the reverse movement of the feeder member 18 and for the throwing-in of the pawl and ratchet mechanism at the beginning of a new series of feeding movements. For this purpose there is provided in the construction shown a locking means and a manually controlled member so that the shaft 182 may be locked against the movement which will throw in the clutch 174 on the shaft 120, the manually controlled member being capable of manipulation to release the lock at a time determined upon by the operator. In the illustrated machine the sleeve 200 which is fixed to the shaft 182 carries fixedly secured thereto an arm 218 which has at its upper end a notch and shoulder 220 adapted to be engaged by a latching pawl 222 fixedly secured to a short shaft 224 pivoted in the machine frame and having secured to its other end a manually operable member 226 which may carry a handle 228, a spring 230 being provided which operates to urge the latching pawl 222 constantly in the direction to effect a latching connection with the notch and shoulder 220 at the upper end of the arm 218. It will be clear that the arm 218 is moved to a position where the latch 222 may be engaged with the shoulder 220 through the rotation of the shaft 182 in a counter clockwise direction, as a result of the separation of the clutch members 174 and 168. It will be understood that with the latch 222 engaged with the arm 218 thus preventing rotation of the shaft 182 in a clockwise direction, means is provided for insuring against the throwing in of the clutch 174 since the bell crank 180 can not be moved in a direction to slide the clutch member 174 along the shaft 120 to engage with the worm wheel 168. As above described this operation of clutching the shaft 120 to the worm gear 168 would normally take place when the pin or stud 92 carried by the ratchet wheel 60 engages with the lever arm 96 moving it to the left in Fig. 4, since, as stated, the described movement of the lever arm 96 effects a rotation of the shaft 182 through the link connection 212, the spring 210, and the arm 202 fixedly secured to the sleeve 200 pinned to the shaft 182. However, with the latching pawl 222 engaged with the upper end of the arm 218, the described movement of the lever arm 96 has the result only of putting the spring 210 under compression, and hence, following the throwing out of the pawl and ratchet feed, all movement of the feeder member 18 comes to an end, the said feeder remaining in position closely adjacent to the knife or cutter 20. With the compression of the spring 210 it is clear that energy is stored up in the operation of the machine and that upon moving the latch 222 to inoperative position the spring will at once rotate the shaft 182 and thus effect the throwing in of the clutching member 174 to initiate rotation of the shaft 120, whereupon as above described the clutch 130 is thrown in to secure rotation of the gear 122 and thus of the shaft 44 to move the same continuously in the reverse direction to run the feeder member 18 back to its initial position. The purpose of providing the latch 222 is to place what would otherwise be a purely automatic means for driving the feeder member 18 under the control of the operator so that the latter may have time, if for any reason he is interrupted in his work, to place new material on the table for insertion into the machine and time also for removing the blanks or other finished product from the magazine provided for receiving the same, or for removing filled magazines and substituting empty ones therefor. Ordinarily the operator will have time to perform these operations by strict attention to his duty, in which case he will remove the latch 222 from latching position by the proper manipulation of the member 226 before the termination of the feeding-in movement of the member 18, and hence, immediately after the step-by-step movement of the feeder member 18 has been completed, there begins operation of the means for reversing the ratchet wheel 60 and bringing it to its initial position which is accompanied by the return of the feeder member 18 to its initial position and this is automatically succeeded by the throwing in of the pawl and ratchet mechanism so that the step-by-step feeding movement of the feeder member 18 is repeated, and these operations continue automatically so long as the operator keeps moving the latch pawl 222 from engagement with the arm 218, and this he may do any time after the freshly introduced stack of strips is started upon its feeding movement toward the cutting knife 20. For holding the controller member 226 with the latching pawl 222 in inoperative position when it has been moved to that position by the operator there is provided a lock 240 (Figs. 1 and 4) adapted to engage in a notch 242 in the lower end of the arm 226 the said lock 240 being urged into operative position by means of a spring 244. Conveniently means is provided for unlocking the controller member 226 as soon as the shaft 182 is rotated to throw in the clutch member 174 initiating the return of the feeder member 18 to its initial position. As shown unlocking of the pawl 240 is effected by means of a bar 246 carried by the arm 218 and adapted to contact with the tail of the locking pawl 240 to unlatch the lock as the arm 218 and shaft 182 move in clockwise direction in a manner above described. At the termination of the return movement of the feeder member 18 to initial position the shaft 182 and the arm 218 move in a counter-clockwise direction as above described thus enabling the latch 222 to drop into its notch 220, this movement of the arm 218 being accompanied by a corresponding movement of the lever arm 96 to the right in Fig. 4 by which the pawl 64 is thrown into operation upon the ratchet wheel 60 thus initiating the step-by-step feeding movement of the feeder member. If the operator is ready with a new piece of work he may at once throw the latch pawl 222 out of operation practically with the first step of the movement of the feeder member 18 toward the right in Fig. 1, so that upon the termination of this movement the clutch member 174 will be thrown into operation to return the feeder member 18 back to its initial position. By the provision of the spring 210 it is possible to utilize a locking pawl like that shown at 222 giving the operator control of the mechanism and at the same time providing for a prompt operation of the machine, due to the energy stored up in the spring 210, upon the instant of release of the locking pawl 222 by proper manipulation of the controller member 226, 228. To assist in securing accurate timing of the parts already described there is mounted on the shaft 182 an arm 250 fixedly secured thereto and having at its free end a dog 252 which rides upon the periphery 254 of the hub portion of the ratchet wheel 42 until the notch 256 is reached when the dog 252 may drop into the notch thus determining the time of rotation of the shaft 182 in a clockwise direction to throw in the clutch member 174 initiating operation of the shaft 120. Upon rotation of the hub 254 the dog 252 which is yieldingly mounted on the end of the arm 250 at once turns out of the notch 256 and then rises upon the surface 254 as above described.

Means is preferably provided for moving the stack of strips S in a transverse direction into the path of the feeder member 18 prior to the feeding-in movement of the latter. In the illustrated embodiment of the invention, the operator is required to place a fresh stack of strips upon the table 12 against an edge gage 260 (Fig. 2) and inside of the upwardly standing fingers 262 (Fig. 3) adjustably secured to slide members 264 which move in grooves 266 in the top surface of the table. Immediately after the return of the feeder member 18 to its initial position at the left of the table, as shown in Figs. 1 and 2, the slides 264 are reciprocated to move the stack of strips into position directly over the slot 34 in the table and to return to initial position whereupon the feeder member 18 becomes operative to progress the stack intermittently toward the knife 20. Conveniently the slide members 264 are operated from the shaft 120 through the cam wheel 146 which is provided with a cam slot to receive a roll 270 (Figs. 1 and 3) on a lever 272 pivotally mounted at 274 in the frame of the machine and having its upper end forked pivotally to receive a block 276 slidable upon a rod 278 and pivotally connected at one end to an arm 280 extending downwardly from the feeder slide 264. Carried by the rod 278 is an adjustable collar 282 with which one end of the block 276 contacts so that upon motion of the upper end of the lever 272 to the left in Fig. 3 the feeder block 264 is positively returned to initial position, there being interposed between the other end of the block 276 and a collar 284 on the end of the rod 278 a spring 286 so that upon movement of the upper end of the lever 272 to the right in Fig. 3 the feeder slide 264 is moved yieldingly to progress the stack of strips into firm contact with upright stops, one of which is shown at 288 in Fig. 3, both of said stops being disclosed in Fig. 2 of the drawings. If preferred the stops 288 may carry a bar 290 (Fig. 2) which extends parallel with the slot 34 in the table 12, that is parallel with the direction of movement of the stack of strips, for aligning these strips and for guiding them during their movement toward the cutter knife under the action of the feeder member 18. In order that two or more feeder fingers 262 may operate simultaneously and to the same extent in the operation of feeding the stack of strips in a direction transversely of their widths, there is provided a rock shaft 292 (Fig. 3) mounted on bars 294 extending rearwardly from the front side of the frame of the machine, the said rock shaft having a plurality of arms 296 fixedly secured thereto and extending upwardly from the rock shaft and having pivotally connected at their upper ends links 298 the other ends of which are pivotally connected to the arms 280 projecting downwardly from the feeder slides 264. It will be understood that the link 298 which is in alignment with the rod 278 serves as a part of the connecting link in the power means for rotating the shaft 292.

As heretofore stated a knife or cutter 20 is provided for severing sections from the ends of the strips by a movement of the knife or cutter transversely of the stack of strips. In the construction shown the knife is movable vertically to effect the cutting operation which takes place at the termination of each feeding movement of the intermittently operated feeder member 18. As shown the knife or cutter 20 has a chisel shaped end or cutter blade and comprises a shank portion 300 (Fig. 1) which is adjustably secured by bolts 302 to a carrier 304 slidable vertically in guideways in the machine frame. For securing adjustment of the cutter vertically there is provided a screw threaded member 306 which may turn to adjust the knife upwardly or downwardly after loosening the bolts 302, the said bolts being afterwards manipulated to secure the knife in fixed position. Extending downwardly from the lower end of the carrier 304 is a relatively heavy arm 308 which carries a roll 310 for engagement with a pair of cams 312, 314 secured to the shaft 316 which is a continuously rotating shaft as will be hereinafter described. Through the operation of these cams the knife is reciprocated positively in both directions and at intervals in properly timed relation with respect to feeding movements of the stock feeder 18. Prior to the operation of the cutter 20 the adjacent end of the stack is firmly clamped upon the work supporting bed 12 through the operation of a presser foot 320 which is carried at the upper end of a reciprocatory member 322 (Fig. 1) which is slidably guided in the machine frame and which is provided with a rack 324 adapted to be engaged by the teeth on a segmental rack 326 constantly in mesh therewith. As shown the rack 326 is carried on the short arm of a lever 328 pivoted in the frame of the machine and connected to the lever 330 which oscillates about the pivot furnished by the bar 74. Carried by the other end of the lever 330 is a cam roll 332 movable in a cam slot in the cam wheel 82 so that upon rotation of the cam wheel the presser foot 320 is caused to clamp the stack of strips in properly timed relation with respect to the operation of the feeder 18 and the cutter 20. In order that the presser foot may be equally effective with stacks of strips which vary somewhat in their height and thickness, the connecting link 334 between the levers 328 and 330 is arranged to be pivoted at its upper end to the long arm of the lever 328 while its lower end passes loosely through a block 336 which is pivoted in the end of the lever 330, a stop or collar 338 being provided on the end of the link 334 which projects beyond the block 336, a spring 340 surrounding the link 334 between an adjustable collar 342 on the link and the upper end of the block 336, the arrangement being such that the presser foot 320 is clamped upon the work through compression of the relatively heavy spring 340. Since the presser foot 320 will come down on top of the feeder 18 while the latter is at rest close up against the knife 20, the upper portion 343 of the feeder member 18 is yieldingly mounted in the lower portion so that it moves down with the presser member 320 and does not obstruct movement of the latter.

After the cutter 20 has operated to sever a pile of sections from the end of the stack of strips, relative movement takes place between the forcing plate 24, which may take the form of a cutting block, and the die 26 the purpose being to move the sections simultaneously toward and progressively upon the cutting edge of the die whereby blanks are cut from the sections. In the construction shown the forcing plate 24 is the movable member while the die is stationary, the former being mounted upon the upper end of a plunger 344 (Fig. 1) slidable vertically in guideways provided in the frame of the machine, one of the guideways being shown at 346. Carried by the plunger 344 is cam roll 350 which is operated upon by two cams in the cam wheel 82 so that the plunger is moved positively in both directions during its reciprocation. In Fig. 1 of the drawings the plunger is at its lowest point with the forcing plate 24 carried thereby in such position that the forward ends of the strips S pass over the upper surface of the plate during the succeeding feeding movement of the feeder member 18. In Fig. 7 of the drawings the forcing plate has reached the upper limit of its movement where it leaves the last section partly cut through on the edge of the die. By this arrangement both die and forcing plate are saved from mutilation and perfect cutting of the stock insured.

In order to align the sections cut from the ends of the strips S there is provided as a most important feature of the positioning means for the sections a gage 22 referred to earlier in this specification. In a preferred construction the gage 22 is an upright member located at the end of a lever 360 (Figs. 1 and 2) pivoted at 362 to the top plate 12 of the frame of the machine and having its free end connected to a spring 364 which tends constantly to urge the gage 22 to the left in Fig. 1. Preferably the forcing plate 24 is slotted as best shown in Fig. 7 to receive the gage 22 so that the said gage may remain in gaging position during upward movement of the forcing plate and for the further purpose of permitting the gage to be positioned initially with its gaging surface inside of the periphery of the forcing plate. In the operation of the feeder member 18 the forward end of the stack of strips is positioned in contact with the gage 22 which at the time is located in the slot in the forcing plate and in a position also within the projection of the cutting edge of the die 26. It will be observed that the knife 20 has a chisel shaped cutting edge, that is, with the bevel all on one side of the cutting edge of the cutter. Hence when the knife or cutter 20 is forced upwardly its full distance the severed sections must move over to the right a distance corresponding to the thickness of the cutter beyond the bevel. See in this connection Figs. 6 and 10. It follows that as each section is cut it is forced with ever-increasing pressure against the gage 22 which must yield to the right in Fig. 1, the result being that at the end of the upward stroke of the cutter all of the sections are located between the vertical surface of the cutter blade and of gage 22 which latter is displaced away from its initial position a distance corresponding to the thickness of the shank of the cutter 20. In this way the sections are perfectly aligned in a vertical direction and are held under control between the gage and the knife while the forcing plate 24 moves upwardly in the operation of cutting blanks from the sections.

In the preferred construction there is provided also a gage 366 (Figs. 2 and 11) which is an upright plate having a horizontal portion 368 which is adjustably mounted in a groove in the top surface of the top plate 12 of the frame and adjustable through a screw threaded member 370 which is provided with a hand wheel 372. Directly opposite the gage 366 is a similar gage 374 which has an upright plate at the end of a horizontally arranged member 376 which is also adjustable along a groove in the table through the operation of a screw threaded member 378 provided with a hand wheel 380. Preferably, however, the gage 374 is yieldingly mounted in the plate 376 and, like the gage 366, has its vertical edge which is adjacent the presser foot 320 bent or beveled away from the path of the stack of strips, as indicated at 381, so that the edge of the strips may not catch on the edge of the gage but on the other hand be guided properly into the position over the forcing plate. Preferably the die 26 has a projecting portion 390 with a rounded lower end so that the forward edge of the top sheet of the stack will not catch on the die or rather will be guided into position below the cutting edge thereof. The projection 390 serves the further purpose of preventing any material getting into the space between the cutter and the adjacent edge of the die. When such a projection is provided on the die a vertical groove 391 is formed in the knife or cutter 20 so that no obstruction is presented to the cutter as it approaches the limit of its upward movement as shown in Fig. 7 of the drawings.

Extending above the top plate or table 12 are brackets 410, 412 which provide a supporting structure 414 for the die 26 and also for a magazine holder as will be hereinafter described. Conveniently each die 26 will have secured thereto a projecting flange 416 which will be slidably received in guideways in the structure 414 so that the die may be readily removed and readily reinserted and secured in position for co-operation with the forcing plate 24. It will be observed (Fig. 11) that the side gages 366 and 374 together with the end gage 22 and the cutter 20 when in its uppermost position together form a pocket in which the sections severed from the end of the stack are enclosed while they rest upon the forcing plate, the latter rising to force the sections upon the cutting edge of the die while the sections are retained by the walls of the pocket against any lateral movement whatever.

While the sections are being forced upon the cutting edge of the die 26 the blanks cut from the sections move progressively in an upward direction through the die and the material severed from the rounded or convexed edge of the blank is moved laterally away from the blanks by the beveled surfaces 392 of the die and to assist in the separation of the scrap material from the blanks, and to clear the die of this scrap material there is preferably provided a wedge shaped cutting blade 394 on the exterior surface of the die, the said blade having a cutting edge which is in the same plane as the cutting edge of the die but extends substantially at a right angle to the said cutting edge as most clearly shown in Fig. 7 of the drawings. Conveniently the gage members 366 and 374 carry plates 420 which are inclined to the horizontal and serve as chutes to discharge the scrap material downwardly and forwardly into a recess at the end of the machine where a bag or box may be located to receive such waste material.

As heretofore stated magazines are provided for receiving the blanks from the die 26, the construction and arrangement of the machine being preferably such that the blanks obtained from one stack of strips are sufficient to fill a magazine 28, and hence at the end of each cycle of operations of the machine, the magazine holder 430 is rotated one step to bring an empty magazine above the die, the same movement of the holder operating to shift the filled magazine to a position where it may be removed by the operator and an empty magazine substituted therefor. Should the operator fail to remove the filled magazine the contents of the latter will be discharged when the magazine reaches a position directly opposite to that occupied by the magazine over the die, there being provided at this point an opening in the supporting plate 432 large enough to permit the blanks to be discharged by gravity from the magazine. Upon reference to Figs. 1, 2, and 12 it will be observed that when the holder 430 starts its rotation those blanks located between the surface of the plate 432 and the lower end of a magazine 28 are swept along over the surface of the plate 432 by means of a yielding gate member 434, and hence all of the blanks in the magazine are supported on the surface of the plate 432 until they reach the discharge opening referred to in the foregoing description. Besides operating as a separator member the gate 434 is useful as a safety device to obviate the danger of injury to the fingers of the operator in case he attempts to remove a filled magazine at a time when the holder is turning or beginning to turn. Furthermore, it will be clear that the yielding gate represents a means for separating the blanks at the surface of the plate 432 in a manner to prevent injury to the blanks or to the machine, since such would occur if an unyielding separator member were provided. It is impossible to insure that the plane of separation between the blanks adjacent to the plane of the top surface of the plate 432 will be exactly in the plane of said upper surface, and hence a blank still within the passages formed in part in the plate 432 would project above the surface of said plate and if engaged by an unyielding member would itself be damaged or cause damage to the machine. Referring more especially to Figs. 1 and 2 of the drawings it will be observed that the magazine holder 430 is carried by a spindle 436 mounted for rotation in the bracket extension 438 upon which rests the plate 432. Rotatable on the spindle 436 is a segment gear 440 (Fig. 2) having an arm upon which is carried a pawl 442 for engagement with ratchet wheel 444 fixed to the said spindle 436. Arranged to be constantly in mesh with the teeth of the segment gear 440 is a rack bar 450, the other end of which is pivoted by means of a link 452 to the upper end of a lever 454 (Figs. 1 and 4), the latter being pivoted upon a stud 456 in a stationary part, such as the frame of the machine, and having its lower end provided with a roll 458 for travel along a cam path 460 in the cam member 462 fixed to the shaft 120. It will be understood then, as before described, that the magazine holder 430 is turned one step to bring an empty magazine in position over the upper end of the die and that this operation takes place during the return of the feeder member 18 to its initial position preliminary to feeding in of a fresh stack of strips. For locking the magazine holder 430 in proper position so that a magazine 28 will be in exact alinement with the die there is provided a latch 470 mounted on the rack slide 450 and adapted to engage one of a plurality of notches 472 properly spaced around the peripheral portion of the holder 430.

Figure 17:
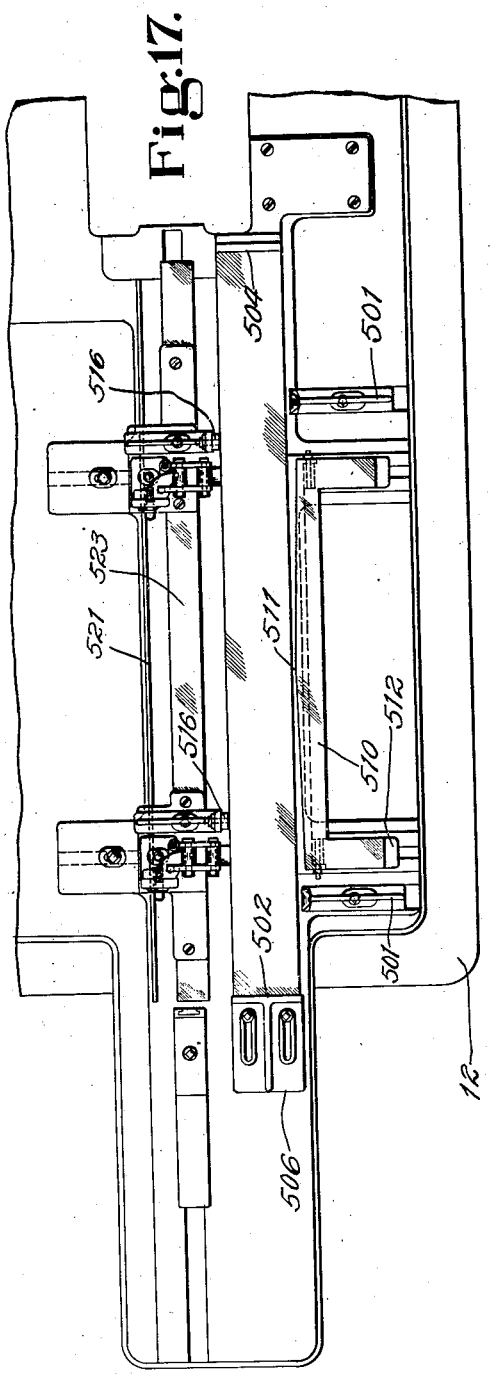
Fig. 17 is a plan view, with the work omitted, of the magazine and feed mechanism shown in Fig. 15.
Figure 18:
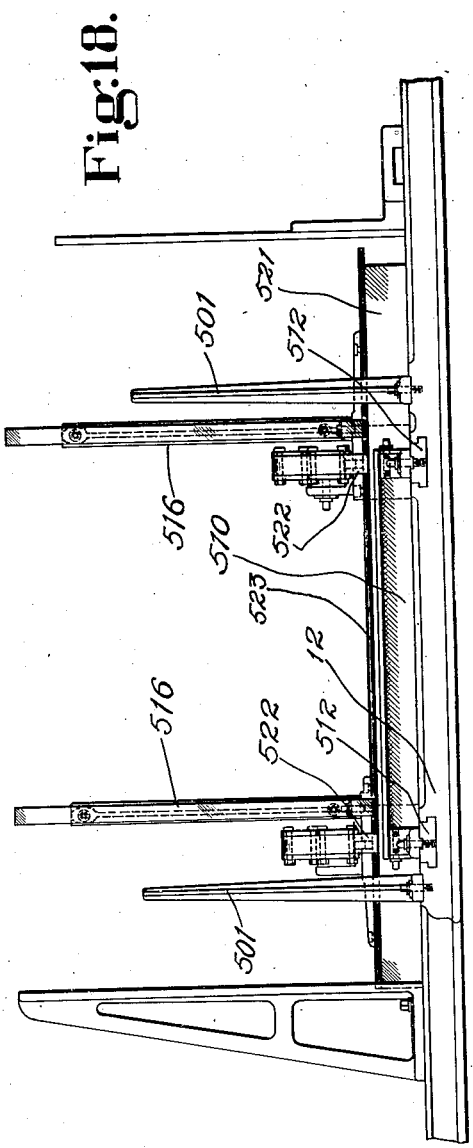
Fig. 18 is a view in front elevation of the parts shown in Fig. 17.

In the illustrated embodiment of my invention, a magazine 500 (Fig. 15) may be provided for the strip or sheet material, the said magazine comprising positioning members 501 secured to the top plate 12 at the front of the machine and two end members 502, 504 of which the former is preferably adjustable as by bolts and slots in the supporting plate 506, as clearly shown in Fig. 17 of the drawings.

When a magazine is used there is preferably substituted for the feed fingers 262 (Figs. 1, 2 and 3) a single-piece feed slide 510, (Figs. 15 to 18 inclusive) the said slide being attached to slide members 512 of similar construction to slide members 264 which support the feed fingers 262. In the feeding of a given number of strips in a widthwise direction from the lower end of the pile of strips, considerable difficulty is often encountered due to the fact that the strips vary somewhat in thickness and this difference in thickness occurs not only as between individual strips but in various parts of the same strip. It will be clear then that if individual fingers should be used, similar to those shown at 262, there would be likely to occur a disarrangement of the strip or strips at the top level of the stack of strips being separated, in which one end of a strip at the level of separation of the strips would be moved forwardly by one finger in the feeding operation while the other end would lag behind due to the fact that it is not engaged by the other feed finger. Such a mode of operation would result in uncertainty in the feeding operations and be almost certainly the cause of damage to the material and obstruction or damage to the machine. Applicant has overcome the difficulties incidental to widthwise feeding of strips of material from the bottom of a stack by the provision of the member 510 which, as shown most clearly in Fig. 17 of the drawings, is provided with a convexly shaped surface 511 for contacting with the piled strips along a vertical line near the longitudinal center thereof, the construction and arrangement being such that contact with the bottom surface of the strip next above those being moved begins adjacent the said line of contact and spreads from either side of said line toward the ends of the member 510. By this construction of the member 510 any strip adjacent to the level of the plane of separation of the strips which is started in the feeding direction will be carried forward with the stack which is being separated, and the strip superjacent thereto even if certain of its portions are below the horizontal level of the upper surface of the member 510 will be left in place in the magazine as the feeding member moves forwardly under said superjacent strip, since the latter is lifted or wedged upwardly in the advance of the feeding member. Opposed to the positioning members 501 are two or more positioning members 516 which constitute the rear side of the magazine 500. As shown, the positioning members 516 are spaced from the table a distance corresponding more or less closely to the height of the stack of strips which it is desired to move into feeding position. Consequently the members 516 are provided with offset vertical portions 520 which serve to support a block plate 521 to limit the movement of the stack of strips in a widthwise direction in such manner that the said stack is properly positioned for the operation of the feeding-in member 18. The said members 516 also carry a top guard piece 523 which prevents upward displacement of the strips. In view of the differences in the thicknesses of strips as already discussed in the foregoing description, it is desirable to provide a special separator means for co-operation with the feed slide 510, the said separator means in the illustrative construction comprising yielding gate members 522 (at least 2 in number), the lower ends of which are in a plane to engage the topmost strip of the stack being separated and to be moved upwardly thereby so as to be sure to engage the strip next superjacent the topmost strip engaged by the feed slide 510 to hold the said strip against movement with the stack being separated by the feed slide. If the said gate members 522, or either of them, should engage the topmost strip being fed-in by the feed slide, each gate is so constructed as to yield upwardly until it disengages said strip. By this construction the feed slide is enabled to feed in the proper number of strips without displacement of the strips in the magazine and without meeting obstruction due to the action of the separator means or gates 522. For mounting the gate members 522 there is provided in the construction shown a pair of parallel links 524, 526 (Fig. 16) pivoted to the gate member and to a bracket 528. The lower link 526 has an extension 530 adapted to engage an adjustable abutment 532 which operates to limit the movement of the gate member in a downward direction. While the gate members 522 may be weighted so that they may interpose sufficient resistance to movement of the strips in the magazine, there is preferably provided a spring-pressed plunger 534 which operates upon an arm 536 extending rearwardly from the link 524. Pressure against the upright face of the gate member 522 is transmitted to the plunger 534 which resists the movement but is properly tensioned to yield after the gate member has served its proper function of separating the strips by holding back those above the stack being fed by the feed slide 510. Since the verticality of the gate is maintained by the link mounting described its lower end retains all its effectiveness throughout its movement as a separating means for the layers or sheets of material. The co-operation of the feed slide 510 and the yielding gate members 522 in separating a predetermined number of strips to comprise the stack which is later to be fed in an endwise direction by the feeding-in member 18 is of the greatest importance since the feeding of either one more or one less than the predetermined number would result in obstruction or in improper operation of the machine. In this connection it is pointed out that if a smaller number of strips be provided in the stack to be fed by the feeding-in member 18 than that for which the machine is set, there will be failure to cut the strips properly due to imperfect operation of the clamping member 320 in its co-operation with the cutter 20. By the use of the magazine herein described the operator is enabled to provide a sufficient number of strips for a number of cycles of the machine so that plenty of time will be afforded for exchanging empty magazines 28 for those filled with blanks at the dieing out end of the machine.

It is desirable that the pile of sheets or strips in the magazine be not allowed to become less than a certain predetermined height in the magazine for the reason that the separating devices comprising the feed slide 510 and the gates 522 work to better advantage when there is a certain pressure on the material from above. Moreover, the sheets or strips at the bottom of the pile are much more apt to lie evenly and to be in close contact with each other if the pile be of a considerable height. To insure the best working conditions for the strip separating and feeding means, there is provided a detector mechanism which will warn the operator of the approaching exhaustion of the supply in the magazine. It may operate to lock the starting means of the machine against operation so that the operator must maintain a certain height of material in the magazine. Upon reference to Fig. 15 one embodiment of the detector means is disclosed as consisting of a detector member 540 which is adapted to project through an opening 542 in the magazine member 501 under the propelling force exerted by the spring 544. When additional strips or sheets of material are introduced from above, certain of them will contact with the rounded end 546 of the detector member 540 and force the latter out of the path of the sheets or strips so that the latter may descend in the magazine without any obstructive effect from the detector member. As soon, however, as the pile of strips or sheets sinks below the level of the detector member the latter is projected into the magazine through the operation of the spring 544 and during this movement of the detector member a stop 548 is positioned in the path of the controller lever 226 so that the latter cannot be moved in a direction to initiate further operations of the machine while the stack of strips or sheets in the magazine is below the predetermined level fixed by the end of the detector member 540. In the construction shown the stop 548 is part of a lever 550 which is pivoted at 552 on the magazine member 501 and connected at its upper end pivotally to the detector member 540.

As will be clear from an inspection of the figures of the drawings and more particularly of Figs. 8 and 10, the sheet material is preferably provided in the form of strips S of a width corresponding to one dimension of the blank to be cut therefrom. While the novel method herein described is applicable to the cutting of one strip at a time, one of the marked advantages of the method resides in the fact that, by the practice of the same, many strips or sheets of material may be operated upon practically simultaneously. As shown, a plurality of strips are placed in superposed relation upon the table 12 and fed into position by the feeding member 18 to have the forward ends thereof cut off by a cutting stroke of the cutter 20, thereby producing a stack of sections which are left in position to be operated upon by the co-operation of the die 26 and the forcing plate 24. In the operation of the cutter 20 the section s cut from the end of the strip is, by that operation, provided with a part of its permanent edge contour. This will be clearly understood by referring to the diagrammatic representation of the cutting operations in Fig. 13, wherein the line b represents the breast edge of the lift B, it being obvious that the edge b was produced by the cut which severed the section from the strip S. It is also clear that the same cut which severed a section from the end of the strip provided the end of the strip with a curved end portion indicated at c. This operation may be regarded as a step in the process of providing the potential blank at the end of the strip S with a rounded end of greater convexity through a succeeding trimming or cutting operation. In other words the edge contour which it is desired that the finished blank shall have, at the end opposite to the breast edge indicated by the character b, is provided as a result of two distinct operations, of which the first is incidental to the cut which severed a preceding section from the strip and which left on the end of the strip the curved edge c. The second operation referred to consists in removing two small, approximately triangular portions t (Fig. 13) in order to provide the final edge contour to this portion of the blank B. Since the width of the strip S is such as to correspond substantially to one dimension of the blank, it follows that the parallel edges h of the blank do not need any further trimming or cutting in the operation of producing the completed blank. Hence, when the sections s are operated upon by the die 26 the only parts cut off from the sections by the die are the roughly triangular parts t. Upon inspection of Figs. 7 and 9 of the drawings it will be clear that the die 26 is, as to its general structure, an ordinary die having a breast edge, side edges and a rear, curved edge, it being preferable to provide a die of this type even though no cutting is performed by certain of the edges, for the reason that the walls of the die form guiding means by which the blank, which is trimmed almost entirely by the rear convex cutting edge, is guided upwardly along a passageway which leads to the magazine. Moreover, in the operation of the die shown, the sections being operated upon retain their proper relative positions during the trimming operations and are not tipped about the convex cutting edge of the die nor displaced laterally, as they might be, were it not for the side walls and cutting edges of the die. Furthermore, the walls of the die are shaped to grip the blanks with sufficient force to support the column of blanks moving upwardly into the magazine 28. Moreover, the breast edge of the die has been retained, although it performs no cutting operation, in order that it may support the member 390 which serves to fill in the space between the die and the slanting surface of the cutter 20, thus preventing any jamming of material between the cutter and the die. Since the extent of the line of cut for the die 26 is greatly reduced by the method of cutting already described it is clear that there is marked economy in the power necessary for the cutting operations and that the method is especially advantageous in cutting operations which involve the use of a die. Another important characteristic of the method herein described is that which involves the cutting of the strips into sections which are displaced progressively with the cutting, so that there is no frictional drag upon the knife or other cutting instrument, as there would be if the material to be cut were clamped down on a work support so that it could not move relatively to the knife during the cutting operations. This frictional drag on the cutting implement is also very marked in those cases in which the cutting is performed by a die shaped to correspond with the shape of the completed blank so that all of the cutting of the blank is done at one time. In such a case the material must be displaced in all directions away from the die, since the walls of the die have appreciable thickness, with the result that great pressure must be exercised in forcing the die through the material. Hence, there is a distinct limit to the number of sheets which can ordinarily be cut by the dieing-out method in which the completed blank is formed at one operation. According to the method of this invention, as herein disclosed, the cutting of the blank is performed in two distinct operations, one of which gives the contour to what becomes the breast edge of the blank when the blank is a heel lift, and also partially shapes the convex edge of the succeeding blank, and the other cutting operation giving the final contour to the convexed edge of the blank opposite to the breast edge of the completed heel lift. During the last mentioned cutting operation the scrap is displaced progressively with the cutting so that there is little or no frictional drag upon the die. When the strips S are presented to this machine the forward end of each of the strips is provided with a curved edge like that shown at *c* while the rear end has a concave edge as indicated at *r* in Fig. 13 of the drawings, the construction and arrangement of the feeding mechanism of the machine being such that the forward edge *c* is brought up against the gage 22 and hence there is no operation of the cutter 20 on the extreme forward edge of the strip. Furthermore, there is no operation by the cutter 20 upon the last section which includes the edge portion *r*, the knife operating merely to shove the sections over against the gage 22.

When it is remembered that the strips S are cut the required width so that the die removes no material from the side edges of a strip and that, as just described, there is no waste at the forward or rear ends of the strip S in the operation of this machine, it will be understood that considerable economy of material has been effected.

Since the strips presented to this machine are of uniform length calculated to provide a certain number of lifts to each strip with no fractional part of a lift or waste piece remaining, it follows that only perfect lifts are provided as a result of the machine operations. Moreover, as pointed out above, there is no cutting operation at the forward end of each strip by the strip sectioning means other than that required to sever the first stack of sections from the strips. More important still, there is no cutting operation performed by the strip sectioning cutter on the last pile of sections, the cutter operating merely to shove the stack of sections into proper place against the gage 22, and hence there is no scrap or waste material at any time as a result of the operation of the cutter or strip sectioning means. It will be understood, then, that the only waste or scrap material is that which is formed as a result of the dieing out operation on the sections, the said scrap material being identified as the small, roughly triangular pieces *t* (Fig. 13). As these are formed during the upward movement of the forcing plate as the sections *s* are progressively forced upon the cutting edge of the die and as these scrap pieces *t* are deflected from a straight upward path by the outer wall of the die and are discharged outwardly and downwardly from the guide, it follows that no scrap or waste pieces can possibly get into the die. Since no imperfect blanks are formed in the cutting operations, and further, since no scrap appears among the blanks it follows that there is no need of inspecting the product of the machine—certainly not for the purpose of selecting and separating perfect from imperfect lifts or of rejecting pieces of scrap or waste material, such as has been necessary heretofore with practically all blank cutting machines with which I am familiar. In other words, the product of the illustrative machine may be transferred directly to another machine for further operations, without the necessity of arranging and selecting operations which have so commonly added to the expense of producing and magazining blanks.

While the method disclosed may be carried out in a series of hand operations with the aid of appropriate tools, it is clear that in the quantity production of blanks from sheet material, the method will be practicable only if such a machine as that herein disclosed be utilized. While the illustrated machine is especially designed for the cutting of sheet material in accordance with the method disclosed, it will be understood that it is not so limited in its application and that the invention and many of its important features may have other and various applications and uses.

Novel mechanism for feeding strips from a magazine herein disclosed is not claimed herein since it forms the subject-matter of my application Serial No. 158,745, filed Jan. 3, 1927.

Having described my invention, what I claim as new and desire to secure by Letters Patent of the United States is:—

1. In a machine of the character described, cutting means for sheet material, means for feeding the material step by step to the cutting means, said feeding means comprising a feeder member, and power means under the control of the operator for returning the feeder member by a continuous movement to initial position.

2. In a machine of the character described, cutting means for sheet material, a feeder member for advancing the sheet material step by step to the cutting means, power means for moving the feeder member in its feeding direction, means for automatically throwing the power means out of operation, and means for returning the feeder member to initial position and for restarting the intermittent feeding movements of the feeder member.

3. In a machine of the character described, a feeder means for cutting sheet material, a feeder member for moving the sheet material in the feeding direction, a pawl and ratchet mechanism for causing intermittent feeding movements of the feeder member, means for returning the feeder member to initial position, and means for throwing the pawl and ratchet mechanism out of operation and for conditioning the feeder returning means for immediate operation at the will of the operator.

4. In a machine of the character described, cutting means for sheet material, a feeder member for moving the sheet material to the cutting means, operating means for moving the feeder member in the feeding-in direction, means for moving the feeder member in the reverse direction to return it to initial position, means automatically operative for discontinuing the feeding-in movement of the feeder member at a predetermined point, and means under the control of the operator for initiating the operation of the means for returning the feeder member to initial position.

5. In a machine of the character described, means for cutting sheet material, a feeder member for feeding the sheet material to the cutting means, means for moving the feeder member in its feeding direction, a separate means for returning the feeder member to its initial position, and connections between the two last mentioned means under the control of the operator for determining the time of operation of the means for returning the feeder member to initial position.

6. In a machine of the character described, means for cutting sheet material, a feeder member for feeding the material to the cutting means, means for moving the feeder member in its feeding direction, means for moving the feeder member in the reverse direction to its initial position, means controlled by the first-mentioned feeder member moving means for initiating operation of the second-mentioned feeder member moving means, and means under the control of the operator for determining the time of operation of the last-mentioned means.

7. In a machine of the character described, cutting means for sheet material, a feeder member for feeding the sheet material to the cutting means, means for operating the feeder member in its feeding direction, means for moving the feeder member in the reverse direction to initial position comprising a normally stationary shaft, a clutch on the shaft, and connections between the first-mentioned feeder member operating means and the clutch for controlling the latter.

8. In a machine of the class described, constantly operated cutting means for sheet material, a feeder member for moving the material to the cutting means comprising a pawl and ratchet mechanism, means automatically operative to throw the pawl and ratchet mechanism out of operation at a predetermined time in the feeding movement of the feeder member, means for returning the feeder member to initial position, said means comprising a normally stationary shaft having a clutch member associated therewith, connections between the clutch and the means for discontinuing the operation of the pawl and ratchet mechanism comprising a spring arranged to be placed under tension through the operation of said last-mentioned means which spring supplies the power to throw in the clutch, and a member under the control of the operator for releasing the power in the spring thereby initiating the return movement of the feeder member to initial position.

9. In a machine of the character described, means for cutting sheet material, means operative to feed the sheet material to the cutting means, means for automatically returning the feeding means to initial position, and means for controlling the last mentioned means to prevent operation thereof without interfering with the operative movements of other parts of the machine.

10. In a machine of the character described, means for cutting sheet material, a feeder member for moving the material to the cutting means, means for moving the sheet material in a lateral direction preliminarily to the movement of the feeder member, and means under the control of the operator and operative automatically for returning the feeder member to initial position and for operating the feeding means which moves the sheet material in a lateral direction.

11. In a machine of the character described, means for cutting sheet material, a feeder member intermittently operative to feed the sheet material to the cutting means, means for returning the feeder member by a continuous movement to initial position, and manually operable means controlled by the machine for initiating operation of the feeder returning means.

12. In a machine of the character described, means for cutting sheet material, a feeder member for moving the material to the cutting means, means for moving the sheet material in a lateral direction preliminarily to the movement of the feeder member, power means for returning the feeder member to initial position and for operating the feeding means which moves the sheet material in a transverse direction, and a manually operable member for initiating operation of the power means.

13. In a machine of the class described, constantly operated cutting means for sheet material, a feeder member for moving the material to the cutting means, means automatically operative to throw the feeder member out of operation at a predetermined time, means for returning the feeder member to initial position, said means comprising a normally stationary shaft having a clutch member associated therewith, connections between the clutch and the means for discontinuing the feeding movements of the feeder member comprising a spring arranged to be placed under tension through the operation of said last-mentioned means which spring supplies the power to throw in the clutch and a member under the control of the operator for releasing the power in the spring thereby initiating the return movement of the feeder member to initial position.

14. In a machine of the character described, means for cutting sheet material, a feeder member for feeding the material to the cutting means, means for moving the feeder member in its feeding direction, means for moving the feeder member in the reverse direction to its initial position, and means controlled by the first-mentioned feeder member moving means for initiating operation of the second-mentioned feeder member moving means.

15. In a machine of the character described, cutting means for sheet material, a feeder member for feeding the sheet material to the cutting means, means for operating the feeder member in its feeding direction, means for moving the feeder member in the reverse direction to initial position comprising a normally stationary shaft, a clutch on the shaft, and connections between the first-mentioned feeder member operating means and the clutch for controlling the latter, and a member under the control of the operator for controlling said connections.

16. In a machine of the character described, cutting means for sheet material, means for feeding the material step by step to the cutting means, said feeding means comprising a feeder member, and power means for returning the feeder member automatically by a continuous movement to initial position.

17. In a machine of the character described, cutting means for sheet material, a feeder member for advancing the sheet material step by step to the cutting means, power means for moving the feeder member in its feeding direction, means for automatically throwing the power means out of operation, and means under the control of the operator for returning the feeder member to initial position and for restarting the intermittent feeding movements of the feeder member.

18. In a machine of the character described, means for cutting sheet material, a feeder member for moving the sheet material in the feeding direction, power means for causing intermittent feeding movements of the feeder member, means for returning the feeder member to initial position, and means for throwing said power means out of operation and for conditioning the feeder returning means for immediate operation at the will of the operator.

19. In a machine of the character described, cutting means for sheet material, a feeder member for moving the sheet material to the cutting means, operating means for moving the feeder member in the feeding-in direction, reversing means for moving the feeder member in the reverse direction to return it to initial position, means automatically operative for discontinuing the feeding-in movement of the feeder member at a predetermined point and for preventing operation of the reversing means, and means for initiating the operation of the means for returning the feeder member to initial position.

20. In a machine of the character described, means for cutting sheet material, a feeder member for feeding the sheet material to the cutting means, means for moving the feeder member in its feeding direction, separate means for returning the feeder member to its initial position, and connections between the two last mentioned means for storing up power for initiating operation of the means for returning the feeder member to initial position.

21. In a machine of the character described, means for cutting sheet material, a feeder member for feeding the material to the cutting means, means for operating the feeder member step by step in the feeding direction, and means automatically operative for returning the feeder member by continuous movement to initial position and for then initiating the step by step feeding movements of the feeder member.

22. In a machine of the character described, means for cutting sheet material, a feeder member for feeding the material to the cutting means, means for operating the feeder member step by step in the feeding direction, and means under the control of the operator and automatically operative for returning the feeder member to initial position by continuous movement and then initiating the step by step movement of the feeder member to feed a freshly inserted piece of material.

23. In a machine of the character described, means for cutting sheet material, a feeder member for feeding the material to the cutting means, means for operating the feeder member step by step in the feeding direction, means automatically operative for returning the feeder member by continuous movement to initial position and for then initiating the step by step feeding movements of the feeder member, and a manually operable member for controlling the last-mentioned means.

24. In a machine of the character described, means for cutting sheet material, a feeder member for feeding the material to the cutting means, means for operating the feeder member step by step in the feeding direction, means automatically operative for returning the feeder member by continuous movement to initial position and for then initiating the step by step feeding movements of the feeder member, and means under the control of the operator for preventing operation of the automatic means.

25. In a machine of the character described, means for cutting sheet material, a feeder member for feeding the material to the cutting means, means for operating the feeder member step by step in the feeding direction, means automatically operative for returning the feeder member by continuous movement to initial position and for then initiating the step by step feeding movements of the feeder member, and a member for preventing operation of the automatic means and movable by the operator to permit operation of the automatic means.

26. In a machine of the character described, means for cutting sheet material, a feeder member for feeding the material to the cutting means, means for operating the feeder member step by step in the feeding direction, means automatically operative for returning the feeder member by continuous movement to initial position and for then initiating the step by step feeding movements of the feeder member, a member for preventing operation of the automatic means and movable by the operator to permit operation of the automatic means, and a lock for holding the member in inoperative position.

27. In a machine of the character described, means for cutting sheet material into blanks, means for feeding the sheet material to the cutting means, means for moving freshly introduced sheet material transversely of the path of the first-mentioned feeding means, and means for stacking the blanks progressively with the cutting thereof from the sheet material.

28. In a machine of the character described, means for cutting blanks from sheet material, means for feeding the material to the cutting means, a plurality of magazines for receiving the blanks from the cutting means, means for feeding freshly introduced material into the path of the first-mentioned feeding means, and means for operating the last-mentioned feeding means and for moving one of the magazines into operative relation with respect to the cutting means preliminarily to the operation of the first-mentioned feeding means.

29. In a machine of the character described, means for cutting blanks from sheet material comprising a cutter, a shaft, a cam member on the shaft for operating the cutter, means for feeding the sheet material step by step to the cutting means, a presser foot for clamping the material prior to each cutting operation, and a lever, operated by a face on said cam member spaced to be nearly opposite to the face which operates the cutter, for operating the presser foot.

30. In a machine of the character described, a cutter for cutting sheet material into sections and simultaneously therewith forming part of the permanent edge contour of the desired blank, and means for completing the formation of blanks from the sections severed by the cutter.

31. In a machine of the character described, a cuttter operative to cut sections from strips of sheet material and simultaneously therewith form part of the permanent edge contour of the desired blank, and relatively movable die and cutter block members for operating on the sections to complete the formation of blanks therefrom.

32. In a machine of the character described, a cutter for cutting transversely of a stack of strips of sheet material thereby severing a pile of sections at each operation, means for feeding the stack of strips step by step to the cutter, and die and cutter block members for operating on each pile of sections to cut blanks therefrom.

33. In a machine of the character described, a cutter movable transversely of a stack of strips of sheet material to cut a pile of sections therefrom, a gage member located in the line of feed of the strips and so related to the cutter that as the latter passes through the strips the cut-off sections are forced against the gage member thereby effecting perfect alignment of the sections, and co-operative die and cutter block members for cutting blanks from the sections aligned by the gage and cutter.

34. In a machine of the character described, a cutter movable transversely of a stack of strips of sheet material to cut a pile of sections therefrom, a gage member located in the line of feed of the strips and so related to the cutter that as the latter passes through the strips the cut-off sections are forced against the gage member thereby effecting perfect alignment of the sections, co-operative die and cutter block members for cutting blanks from the sections, and means for yieldingly retaining the gage member in operative position.

35. In a machine of the character described, a cutter movable transversely of a stack of strips of sheet material for severing a pile of sections from the end thereof, a presser member for firmly clamping the stack of strips prior to the operation of the cutter, and a die and a forcing plate relatively movable for cutting the blanks from the sections.

36. In a machine of the character described, a cutter movable transversely of a stack of strips of sheet material for severing a pile of sections from the end thereof, a presser member for firmly clamping the stack of strips prior to the operation of the cutter, a die and a forcing plate relatively movable for cutting the blanks from the sections, and two gage members angularly related to each other to engage two sides of the sections during the relative movement of the die and forcing plate.

37. In a machine of the character described, a cutter vertically movable to sever a pile of sections from a stack of strips of sheet material, a presser member for firmly clamping the stack of strips prior to the action of the cutter, a die located above the plane of the topmost strip, and a forcing plate movable toward the die for forcing the pile of sections upon the cutting edge of the die whereby blanks are cut from the sections.

38. In a machine of the character described, a cutter vertically movable to sever a pile of sections from a stack of strips of sheet material, a die located above the plane of the topmost strip, a forcing plate movable toward the die for forcing the pile of sections upon the cutting edge of the die whereby blanks are cut from the sections, and means for cutting the scrap material on the outside of the die progressively with the forcing of the sections upon the die thus insuring removal of the scrap material of each section during the cutting of a blank therefrom.

39. In a machine of the character described, means for feeding sheet material step by step for cutting operations thereon, a cutter movable to sever sections from the sheet material, a hollow die and forcing plate relatively movable to cut blanks from the sections, and a plurality of magazines for receiving the blanks from the hollow die, the magazines being movable to present one after another in alignment with the die.

40. In a machine of the character described, a cutter movable transversely of a stack of strips of sheet material to cut a pile of sections therefrom at each operation, means for moving the stack of strips step by step to the cutter, a die for cutting blanks from the sections, and a plurality of magazines for receiving blanks from the die, the construction and arrangement being such that the blanks cut from the stack of strips suffice to fill one magazine, and a new magazine is presented in relation to the die at the same time that a new stack of strips is advanced by feeding means.

41. In a machine of the character described, a die and a forcing plate relatively movable to cut blanks from sections of sheet material, a stationary gage member adapted to prevent movement of the sections in one direction, a gage member in opposition to the first-mentioned gage member and yieldingly held in place to prevent movement of the sections in a second direction during cutting operations, and a third gage member operative to aline the sections as a step preliminary to the cutting operations and to prevent movement of the sections in the third direction.

42. In a machine of the character described, a die and a forcing plate relatively movable to cut blanks from sections of sheet material, a stationary gage member adapted to prevent movement of sections in one direction, a gage member in opposition to the first-mentioned gage member to prevent movement of the sections in a second direction during cutting operations, a third gage member operative to aline the sections as a step preliminary to the cutting operations and to prevent movement of the sections in the third direction, and a cutter movable transversely of a stack of strips of material to sever the sections therefrom and to hold the sections from movement in the fourth direction during the relative movement of the die and forcing plate.

43. In a machine of the character described, means for cutting sheet material into blanks comprising relatively movable members including a die, means for causing constant reciprocations of the blank cutting means, means for feeding sheet material step by step to the cutting means, and means for running the feeding means by continuous movement back to initial position and for initiating the step by step movement of the feeding means, the construction and arrangement being such that the cutting means is at all times in operation for the cutting of blanks from the material.

44. In a machine of the character described, cutting means for cutting blanks from sheet material, means for feeding sheet material to the cutting means, means for automatically throwing the feeding means out of operation at a predetermined point in the exhaustion of the sheet material, the construction and arrangement being such that the cutting means is constantly in operation, and power means under the control of the operator for returning the feeding means to initial position and for initiating the step by step feeding of freshly introduced sheet material.

45. In a machine of the character described, relatively reciprocable cutting means for cutting blanks from sheet material, means for feeding sheet material step by step to the cutting means, means for automatically throwing the feeding means out of operation at a predetermined point in the exhaustion of the sheet material, the construction and arrangement being such that the cutting means is constantly in operation, and means automatically operative for returning the feeding means to initial position and for initiating the step by step feeding movement of the feeding means upon freshly introduced material.

46. In a machine of the character described, relatively reciprocable cutting means for cutting blanks from sheet material, means for feeding sheet material step by step to the cutting means, means for automatically throwing the feeding means out of operation at a predetermined point in the exhaustion of the sheet material, the construction and arrangement being such that the cutting means is constantly in operation, means automatically operative for returning the feeding means to initial position and for initiating the step by step feeding movement of the feeding means upon freshly introduced material, and a member under the control of the operator for initiating operation of the automatic means.

47. In a machine of the character described, cutting means for operating on sheet material, means for causing constant operation of the cutting means, a feeder member for the sheet material, means for intermittently operating the feeder member comprising connections to the constantly operating means for the cutting means, and means, comprising a normally stationary driving means, for causing a return movement of the feeder member to initial position and the initiation of the operation of the feeder upon freshly introduced sheet material.

48. In a machine of the character described, means for feeding sheet material step by step to the cutting means, means for throwing the feeding means out of operation with the exhaustion of the sheet material, and means for returning the feeding means to initial position and for throwing the first-mentioned feeding means into operation for feeding freshly introduced sheet material to the cutting means.

49. In a machine of the character described, means for cutting sheet material, power means for feeding sheet material to the cutting means, means for returning the feeding means to initial position, and means for storing up energy in the operation of the machine for initiating operation of the power means.

50. In a machine of the character described, means for cutting sheet material, power means for feeding sheet material to the cutting means, means for returning the feeding means to initial position, a spring arranged to be tensioned in the operation of the machine for initiating operation of the power means, and a member under the control of the operator for releasing the spring thereby determining the time of operation of said power means.

51. In a machine of the character described, relatively removable die and cutting plate members for cutting blanks from sections of material, a cutter for cutting the sections from the ends of strips of material, and a pocket into which the sections are forced by the cutter during the severing operation, the construction and arrangement being such that the die and cutting plate members operate upon sections controlled by the walls of the pocket which prevent lateral displacement of the sections and insuring perfect cutting of the blanks.

52. In a machine of the character described, means for cutting sheet material, means for feeding sheet material to the cutting means, power means for returning the feeding means to initial position, a spring arranged to be tensioned in the operation of the machine for initiating operation of the power means, and a member under the control of the operator for releasing the spring.

53. In a machine of the character described, means for cutting sheet material, means for feeding sheet material to the cutting means, power means for returning the feeding means to initial position, and means for storing up energy in the operation of the machine for initiating operation of the power means.

54. That improvement in methods of cutting sheet material into heel lifts which comprises cutting a strip of material into sections at lift length intervals by cuts which give final shape to a portion of each section and a complemental contour to other portions of the sections so related to the final contour of the lift that the length of the line of cut to produce said final contour of the lift is reduced for the final cutting operation, and finally trimming the sections to complete the shaping of the lifts.

55. That improvement in methods of cutting sheet material into heel lifts which comprises cutting a strip of material into sections by cuts which give final shape to a portion of each section and simultaneously produce a contour on another portion of each section which approaches final contour for said latter portion so that cutting to secure the final contour of the lift is lessened, and then cutting to produce the final contour of the lift.

56. That improvement in methods of producing heel lifts which consists in stripping sheet stock to substantially the width of a desired lift, and cutting lifts off of the strips by transverse cuts each of which imparts, respectively, rounded end shape and breast end shape to the adjacent ends of the lift just severed and the succeeding lift still on the strip.

57. That improvement in methods of producing heel lifts from sheet material which comprises cutting a strip of such material by transverse cuts each of which forms a curved breast end on one lift and partially forms the convex heel end on the next succeeding lift.

58. That improvement in methods of producing blanks which consists in stripping sheet stock to substantially the width of a desired blank, removing from the strip at blank length intervals pieces of stock by cuts completely across the strip and which partially shape the pieces to the desired contour along portions thereof, and completing the shaping of the pieces into blanks.

59. That improvement in methods of producing heel lifts which consists in stripping sheet stock, severing a blank from the strip by a cut extending completely across the strip that leaves the desired breast curvature on the blank, and trimming the opposite end of the blank to produce the rounded-end shape desired on the lifts.

60. That improvement in methods of producing heel lifts which consists in stripping sheet stock to substantially the width of a desired lift, trimming one end of the strip to a contour complemental of that of the breast end of the lift, severing from the strip by a parallel cut a blank of the length of the desired lift, and trimming the corners of the opposite end of the blank to produce the rounded rear-end shape of the lift.

61. That improvement in methods of producing blanks which consists in piling a plurality of strips in superposed relation against an abutment so that the ends of the strips are in vertical alinement, cutting through the strips to produce a set or stack of pieces which are alined by the abutment, and completing the shaping of the pieces into the desired blanks.

62. That improvement in methods of producing blanks which consists in piling a plurality of strips on one another, thrusting through the pile a chisel knife having its bevel toward the pieces being cut off and allowing each cut-off piece to be displaced endwise as it is severed from the strip, thus producing a stack of vertically alined sections, and trimming the edges of the stacked sections with the exception of the freshly cut edges to effect final shaping of the sections.

63. That improvement in methods of producing blanks which consists in piling a plurality of strips on one another, thrusting through the pile a chisel knife having a bevel on one side only whereby each cut-off piece and strip are displaced endwise relatively to each other progressively with the cutting operation to produce a stack of perfectly alined pieces, and then trimming the cut-off pieces along portions of the periphery of each with the exception of that portion produced by the first-mentioned cut.

64. That improvement in methods of producing blanks which consists in stripping sheet material in widths exactly corresponding to one dimension of the desired blank whereby two opposite edge portions of the completed blank are initially provided for as completed portions of the permanent contour, severing pieces from a strip of the sheet material by cuts which provide another edge contour of each of the completed blanks, and subsequently operating on a fourth edge portion of the blank section to complete the contour of the blanks.

65. That improvement in methods of producing blanks which consists in piling up in superposed relation a plurality of strips of sheet material, severing sections from the pile of strips by means of a cutter which passes successively through all of the strips in the pile to provide a set or stack of superposed sections, and subsequently moving the stack of sections and a die relatively to each other to trim the sections and thus complete the edge contour of the sections to make blanks of a predetermined shape.

66. That improvement in methods of producing blanks from sheet material which comprises successively cutting a strip of such material by transverse cuts which give a curved contour to one edge of a completed blank and at the same time partially form the opposite edge of the next succeeding blank.

67. In a machine of the character described, a cutter arranged to sever sections successively from the end of a strip of sheet material, and a cutting die for completing the shaping of the sections into blanks of predetermined peripheral or edge contour.

68. In a machine of the class described, a cutter operable to sever sections successively from strips of sheet material arranged in superposed layers so that the sections form a pile or stack, and a gage arranged to co-operate with the cutter in aligning the sections vertically in the stack progressively with the severing of the sections from the strips.

69. In a machine of the character described, a cutter for severing sections from superposed strips of sheet material, a gage co-operating with the cutter to align the sections progressively with the cutting operations, and a second cutter for trimming the alined sections to make blanks of predetermined shape.

70. In a machine of the class described, a gage for positioning a stack of strips with their corresponding edges aligned, a cutter operative to sever sections from the superposed strips, means for clamping the strips during the cutting operation, and a second cutter for trimming the sections to complete the shaping of the sections into blanks of predetermined shape.

71. A cutter operative to sever sections from superposed strips of sheet material and leave the sections in superposed relation, a second cutter for trimming the sections to complete the shaping of the sections into blanks of predetermined shape, and members for holding the sections in superposed relation during the trimming operation.

72. In a machine of the character described, means for clamping the strips in superposed relation during cutting operations, a cutter arranged to sever sections from the ends of the strips, and a die having edge portions spaced apart the width of the strips so that no cutting takes place at the sides of the sections and provided further with a curved portion for completing the shaping of the sections into blanks of predetermined contour.

73. In a machine of the character described, means for clamping superposed strips of sheet material, a cutter for severing sections from the strips, a gage co-operating with the cutter to align the sections progressively with the cutting operations, and a second cutter for trimming the sections to make blanks of predetermined shape, the said gage being arranged to co-operate with the first cutter to maintain the sections in alignment during the trimming operation.

74. A cutter for severing sections from the ends of strips of sheet material arranged in superposed layers, and a gage for positioning the strips with respect to the cutter, the gage subsequently co-operating with the cutter to aline the sections vertically with respect to each other.

75. A stationary die having its cutting edge facing downwardly, a member for forcing a plurality of layers of sheet material upwardly against the cutting edge of the die to cut blanks therefrom, the construction being such that the member stops short of contact with the cutting edge of the die whereby the last or lowermost layer of material is left supported on the cutting edge of the die, and a gage movable into and out of position beneath the die and the layer supported on the cutting edge thereof to operate as positioning means for succeeding sheet material during cutting operations thereon.

76. A co-operating die and work supporting member relatively movable toward and from each other to force sheet material upon the cutting edge of the die so arranged that the said cutting edge does not contact with the member during continued cutting operations, and a gage movable into and out of the path of relative movement of the die and member to operate as a positioning means for the sheet material.

77. In a machine of the character described, a cutter operative to cut sections from sheet material and to move each section laterally into blank cutting position, and means for cutting blanks from the sections.

78. In a machine of the character described, a die for cutting blanks from sections of sheet material, and a cutter for severing the sections from sheet material and for moving each severed section into proper position for the operation of the die.

79. In a machine of the character described, a die and cutter block relatively movable to cut blanks from sections interposed therebetween, and a cutter operative to cut sections from sheet material and to move the sections into position between the die and cutting block and to aline them with respect to the die prior to a blank cutting operation.

80. In a machine of the character described, a cutter operative to cut a pile of sections from the end of a stack of sheets and to move the sections laterally into blank cutting position, and means for cutting blanks from the sections.

81. In a machine of the character described, a relatively movable die and cutting block for cutting blanks from sections of sheet material, and a cutter for severing the sections from the end of a pile of sheets and for moving the severed sections into proper position for the operation of the die and cutting block.

82. In a machine of the character described, a die and cutter block relatively movable to cut blanks from sections interposed therebetween, and a cutter operative to cut sections from a pile of sheet material and to move the sections into proper position between the die and cutting block and to aline them with respect to the die prior to a blank cutting operation on the sections.

83. In a machine of the character described, die and forcing plate members relatively movable to cut blanks from sections of sheet material, means for feeding a pile of sheets into position between said members, a gage located in the path of the pile of sheets, and a cutter movable transversely of the pile of sheets to cut sections therefrom and to force the sections against the gage so that both the gage and the cutter co-operate to locate the sections properly for the operation of the die and forcing plate.

84. In a machine of the character described, a die and a forcing plate relatively movable to cut blanks from sections of sheet material, a cutter for severing a stack of sections from a pile of sheet material, and a gage against which the pile of sheets is positioned preliminarily to the operation of the cutter, the construction and arrangement being such that the gage yields laterally as the cutter severs the sections from the sheets so that the gage and cutter co-operate in alining the sections prior to the blank cutting operation.

85. In a machine of the character described, a die and a forcing plate relatively movable to cut blanks from sections of sheet material, means for feeding sheet material into the space between the die and forcing plate, a gage at the further side of the forcing plate in the direction of feed of the material and movable to position the sheet material before it is cut and subsequently to another position to locate the severed sections, and a cutter for severing sections from the sheet material and locating them against the gage.

86. In a machine of the character described, a gage, means for feeding sheet material into position against the gage, a cutter for severing sections from the sheet material, the gage and cutter being relatively movable to position the sections with their edges in alinement, and means for cutting blanks from the sections while the latter are held in position by the cutter and gage.

87. In a machine of the character described, a die having its cutting edge facing downwardly, a forcing plate movable toward and from the die for forcing sections of sheet material upon the cutting edge thereof, means for feeding a pile of sheets over the upper face of the forcing plate, and a cutter for cutting off a stack of sections from the pile of sheets, and for moving them laterally over the forcing plate into proper position for the action of the die and forcing plate.

88. In a machine of the character described, a forcing plate having a recess therein, a gage normally located in the recess of the forcing plate, a die for co-operation with the forcing plate, a cutter for severing sections from sheet material and forcing the sections over against the gage displacing the latter out of said recess in the forcing plate, and means for causing relative movement between the die and forcing plate to cut blanks from said sections.

89. In a machine of the character described, a die and a forcing plate relatively movable toward and from each other for cutting blanks from sections of sheet material, means constantly operating to cause relative reciprocatory movement between the die and forcing plate so long as power is supplied to the machine, a constantly reciprocable cutter for severing sections from sheets of material, means for intermittently feeding sheet material into position for the operation of the cutter and the die, means for automatically stopping the operation of the feeding means when the sheet material is exhausted, and means automatically operative for running the feeding means back to initial position and for repeating the intermittent feeding operations upon a fresh supply of sheet material.

90. In a machine of the character described, a die and a forcing plate relatively movable to cut blanks from sections of sheet material, means constantly operating to cause such relative movement so long as power is supplied to the machine, a constantly reciprocable cutter for severing sections from sheet material and placing the sections into position for the operation of the die, a constantly reciprocable presser member for clamping the sheet material preliminarily to the operation of the cutter, and means for intermittently feeding the sheet material for the operation of the cutter and die.

91. In a machine of the character described, a die and a forcing plate relatively movable to cut blanks from sections of sheet material, means constantly operating to cause such relative movement so long as power is supplied to the machine, a constantly reciprocable cutter for severing sections from sheet material and placing the sections into position for the operation of the die, a constantly reciprocable presser member for clamping the sheet material preliminarily to the operation of the cutter, means for intermittently feeding the sheet material for the operation of the cutter and die, and means for running the feeding means by continuous movement back to initial position and for repeating the intermittent feeding movement of the feeding means.

92. In a machine of the character described, means for intermittently cutting stacks of sections from a pile of sheet material, and means operating upon each stack of sections in succession to cut blanks therefrom.

93. In a machine of the character described, means for cutting blanks from sections of sheet material, and a cutter for severing stacks of sections from a pile of sheet material and moving the stacks one at a time into position for the operation of the blank cutting means.

94. That improvement in methods of cutting sheet material into blanks which comprises cutting sheet material into strips of a length calculated to produce a predetermined number of blanks from each strip with no fractional part of a blank remaining along the central longitudinal line of the strip, providing each strip at one end with an edge contour which becomes part of the permanent edge contour of a blank cut from that end of the strip, and subsequently cutting the strip into the proper number of blanks.

95. That improvement in methods of cutting sheet material into blanks which comprises cutting the material into strips, each strip being so related to the blanks cut therefrom that the longitudinal dimension of the strip is exactly equal to the sum of the analogous dimensions of the blanks cut therefrom, providing each strip at one end with an edge contour which becomes part of the permanent edge contour of a blank cut from that end of the strip, severing the strips into as many sections as there are blanks to be cut from the strip, and subsequently cutting blanks from the sections.

96. That improvement in methods of cutting sheet material into blanks which comprises cutting sheet material into strips corresponding exactly in width to one dimension of the proposed blanks, each strip being also of a length to produce exactly a given whole number of blanks without any waste remainder along the central longitudinal line of the strip, sectioning the strip by transverse cuts into sections corresponding exactly in number to the given number of blanks, and subsequently cutting blanks from the sections.

97. That improvement in methods of cutting sheet material into blanks which comprises cutting the material first into strips calculated to produce exactly a given whole number of equal sections, cutting the strips into sections, and subsequently cutting a blank from each section, thereby insuring against the formation of imperfect blanks from under-sized pieces of material.

98. That improvement in methods of cutting sheet material into blanks which comprises cutting the material into strips of a width corresponding to a given dimension of the proposed blank and cutting each strip of a length to produce exactly a given whole number of blanks without any waste remainder along the central longitudinal line of the strip, providing one end of the strip with an edge contour corresponding exactly to part of the permanent edge contour of the blank cut from that end of the strip, severing the strip into sections by transverse cuts each of which produces an edge portion on a section which corresponds exactly to the contour of the described end of the strip, and subsequently cutting blanks from the sections.

99. In a machine for cutting blanks from strips of material each calculated to produce a whole number of blanks with no fractional part of a blank remaining along the central longitudinal line of the strip, a cutter for severing the strip by transverse cuts into sections and for moving each section as it is cut into blank cutting position, and means for cutting blanks from the sections.

100. In a machine for cutting blanks from strips of material each calculated to produce a whole number of blanks with no fractional part of a blank remaining along the central longitudinal line of the strip, a cutter for severing each strip into sections by transverse cuts, the number of which is one less than the number of sections, and means for cutting blanks from the sections.

101. In a machine for cutting blanks from strips of material each calculated to produce a whole number of blanks with no fractional part of a blank remaining along the central longitudinal line of the strip, a cutter for cutting each strip into sections and simultaneously therewith moving each section to blank cutting position, said cutter operating also to move the last section remaining after the last cutting operation laterally into blank cutting position, and means for cutting blanks from the sections.

102. In a machine for cutting blanks from strips of material each calculated to produce a whole number of blanks with no fractional part of a blank remaining along the central longitudinal line of the strip, a cutter for cutting each strip into sections and simultaneously therewith moving each section to blank cutting position, said cutter operating also to move the last section remaining after the last cutting operation laterally into blank cutting position, and a die operating to cut blanks from the sections and to reject the waste portions of the sections, whereby no imperfect blanks and no waste pieces enter the die.

103. That improvement in methods of cutting sheet material which comprises cutting sheets to a length calculated to produce exactly a given whole number of sections along one dimension of the sheet, cutting the sheets into sections, and cutting a blank from each section, thereby insuring against the formation of imperfect blanks from under-sized pieces of material.

104. In a machine of the character described, a die, a forcing plate to force sections of sheet material on the die, a support upon which strips of material rest, a clamp for clamping a stack of strips on the support, and a cutter for severing sections from the ends of the strips, the said cutter serving also as a gage to position the sections while they are operated upon by the die.

105. In a machine of the class described, a support for a stack of strips, a clamp movable toward and from the support to clamp the stack during a cutting operation, a cutter movable to cut a pile of sections from the end of the stack of strips, a die, a forcing plate movable toward the die for forcing the sections upon the cutting edge of the die, and a member in the path of the forcing plate to serve as a gage for the pile of sections during the operation of the die thereon.

106. In a machine of the class described, a die, a forcing plate movable toward and from the die for forcing pieces of material upon the cutting edge of the die, said forcing plate having a notched portion, and a gage member movable in the notched portion of the forcing plate and operative to locate the pieces of material during the cutting operation.

107. In a machine of the character described, a die and a forcing plate relatively movable toward and from each other to cut blanks from a pile of sections of sheet material, said forcing plate having a notched portion, and a gage member movable in the notched portion for locating the pile of sections and for maintaining them in proper position during the cutting operation.

108. In a machine of the character described, a support for a stack of strips, a cutter for severing a pile of sections from the end of the stack of strips, a forcing plate and a die relatively movable for cutting blanks from the pile of sections severed by the cutter, said forcing plate having a notched portion, and a gage member movable in the notched portion of the forcing plate in a direction toward the cutter to locate the stack of strips preliminarily to the operation of the cutter, said gage member being subsequently movable away from the cutter to a location where it positions the sections during the operation of the die and forcing plate.

109. In a machine of the class described, a die, a support for a stack of strips, a clamp movable toward and from the support to clamp the stack during a cutting operation, a cutter movable to cut a pile of sections from the end of the stack of strips and to move the sections into position in alinement with the die, and means for forcing the sections against the cutting edge of the die to have blanks cut therefrom.

110. In a machine of the character described, a cutter for severing sections from sheet material, and means comprising the cutter for alining the sections progressively with the severing thereof from the material.

111. A cutter for severing sections from the end of a stack of sheets, and a member located in the line of feed of the sheets for positioning the latter prior to a cutting operation, said cutter and member being relatively movable to aline the section vertically in a stack.

112. In a machine of the character described, means for cutting sheet material, means for feeding the sheet material to the cutting means, power means for returning the feeding means to initial position, manually operable means for controlling the power means, and means for storing up energy in the operation of the machine for initiating operation of the power means at the proper time following operation of the manually operable means.

In testimony whereof I have signed my name to this specification.

RALPH C. SIMMONS.